United States Patent
Park et al.

(10) Patent No.: US 12,076,951 B2
(45) Date of Patent: Sep. 3, 2024

(54) METHOD OF MAKING OPTICAL ARTICLES HAVING GRADIENT LIGHT INFLUENCING PROPERTIES

(71) Applicant: Transitions Optical, Inc., Pinellas Park, FL (US)

(72) Inventors: David John Park, Tuam (IE); Delwin S. Jackson, Clearwater, FL (US); Anil Kumar, Murrysville, PA (US); John S. Ligas, Palm Harbor, FL (US); Philip Miller, Dallas, TX (US); Brian Smyth, Tuam (IE)

(73) Assignee: Transitions Optical, Inc., Pinellas Park, FL (US)

( * ) Notice: Subject to any disclaimer, the term of this patent is extended or adjusted under 35 U.S.C. 154(b) by 176 days.

(21) Appl. No.: 15/767,370

(22) PCT Filed: Oct. 30, 2015

(86) PCT No.: PCT/US2015/058419
§ 371 (c)(1),
(2) Date: Apr. 11, 2018

(87) PCT Pub. No.: WO2017/074444
PCT Pub. Date: May 4, 2017

(65) Prior Publication Data
US 2018/0290408 A1    Oct. 11, 2018

(51) Int. Cl.
| | | |
|---|---|---|
| *B29D 11/00* | (2006.01) | |
| *G02B 5/23* | (2006.01) | |
| *G02B 5/30* | (2006.01) | |
| *G02C 7/02* | (2006.01) | |
| *G02C 7/10* | (2006.01) | |
| *G02C 7/12* | (2006.01) | |

(52) U.S. Cl.
CPC .. *B29D 11/00644* (2013.01); *B29D 11/00653* (2013.01); *B29D 11/00903* (2013.01); *B29D 11/00923* (2013.01); *G02B 5/23* (2013.01); *G02B 5/3016* (2013.01); *G02B 5/3033* (2013.01); *G02B 5/305* (2013.01); *G02C 7/022* (2013.01); *G02C 7/102* (2013.01); *G02C 7/105* (2013.01); *G02C 7/12* (2013.01); *B29D 11/00865* (2013.01)

(58) Field of Classification Search
CPC ...... G02C 7/104–105; B29D 11/00653; B29D 11/00644
See application file for complete search history.

(56) References Cited

U.S. PATENT DOCUMENTS

| | | | |
|---|---|---|---|
| 2,334,446 | A | 11/1943 | Serrell |
| 3,756,814 | A | 9/1973 | Bedell |
| 3,914,016 | A * | 10/1975 | Dreyer |
| 4,245,991 | A | 1/1981 | Haddad et al. |
| 6,520,999 | B1 | 2/2003 | Kamata et al. |
| 7,097,303 | B2 | 8/2006 | Kumar et al. |
| 7,201,948 | B2 | 4/2007 | Moia et al. |
| 7,256,921 | B2 | 8/2007 | Kumar et al. |
| 7,342,112 | B2 | 3/2008 | Kumar et al. |
| 7,374,282 | B2 | 5/2008 | Tendler |
| 7,572,006 | B2 | 8/2009 | Begon et al. |
| 7,632,540 | B2 | 12/2009 | Kumar et al. |
| 7,656,581 | B2 | 2/2010 | Giraudet |
| 8,012,386 | B2 | 9/2011 | Clerc |
| 8,089,678 | B2 | 1/2012 | Kumar et al. |
| 8,172,393 | B2 | 5/2012 | Tendler |
| 8,342,680 | B2 | 1/2013 | Wada |
| 8,649,081 | B1 | 2/2014 | DeMeio et al. |
| 8,651,660 | B2 | 2/2014 | Barzak et al. |
| 8,926,091 | B2 | 1/2015 | Kumar et al. |
| 9,857,503 | B2 | 1/2018 | Kojima et al. |
| 2002/0080488 | A1 | 6/2002 | Nakagoshi |
| 2002/0180916 | A1 | 12/2002 | Schadt et al. |
| 2004/0257525 | A1 | 12/2004 | Moravec et al. |
| 2005/0151926 | A1* | 7/2005 | Kumar .............. G02B 1/10 351/159.56 |
| 2005/0196617 | A1 | 9/2005 | King |
| 2006/0055880 | A1 | 3/2006 | Kumar et al. |
| 2006/0114388 | A1 | 6/2006 | Power |
| 2007/0146574 | A1 | 6/2007 | Giraudet |
| 2007/0285613 | A1 | 12/2007 | Hobbs |
| 2008/0180803 | A1 | 7/2008 | Seybert et al. |
| 2011/0032475 | A1 | 2/2011 | Watanabe et al. |

(Continued)

FOREIGN PATENT DOCUMENTS

| | | |
|---|---|---|
| CN | 1130259 A | 9/1996 |
| CN | 1403836 A | 3/2003 |

(Continued)

OTHER PUBLICATIONS

Purwar, "Application of natural dye on synthetic fabrics: A review", International Journal of Home Science, 2016, pp. 283-287, vol. 2, No. 2.

*Primary Examiner* — Alex A Rolland
(74) *Attorney, Agent, or Firm* — The Webb Law Firm

(57) ABSTRACT

A method of making an optical article having a gradient tint and a gradient polarization. The method includes contacting one or more dye compositions including at least one of a dichroic dye, a photochromic-dichroic dye, or any combination thereof, with an optical element having a continuous coating including at least one alignment zone. At least a portion of the dye composition diffuses into the coating at a predetermined concentration gradient along at least a portion of the coating.

14 Claims, 18 Drawing Sheets

(56) References Cited

U.S. PATENT DOCUMENTS

| | | |
|---|---|---|
| 2011/0043902 A1 | 2/2011 | Ishibashi et al. |
| 2011/0135850 A1 | 6/2011 | Saha et al. |
| 2012/0120473 A1 | 5/2012 | Kumar et al. |
| 2013/0022739 A1 | 1/2013 | Biteau et al. |
| 2015/0253465 A1* | 9/2015 | Trapani .................... G02C 7/12 156/277 |
| 2015/0261011 A1 | 9/2015 | Trapani et al. |
| 2015/0276987 A1 | 10/2015 | McKenzie et al. |
| 2017/0246302 A1 | 8/2017 | Jennings et al. |

FOREIGN PATENT DOCUMENTS

| | | |
|---|---|---|
| CN | 1719306 A | 1/2006 |
| CN | 1922283 A | 2/2007 |
| CN | 101013175 A | 8/2007 |
| CN | 1902529 B | 3/2011 |
| CN | 102858521 A | 1/2013 |
| EP | 0982432 A2 | 3/2000 |
| EP | 2284601 A1 | 2/2011 |
| EP | 2450193 A1 | 5/2012 |
| EP | 2895897 A1 | 7/2015 |
| JP | 6241126 U | 3/1987 |
| JP | 04307300 A | 10/1992 |
| JP | 0815681 A | 1/1996 |
| JP | 08254603 A | 10/1996 |
| JP | 2005189603 A | 7/2005 |
| JP | 2007518135 A | 7/2007 |
| JP | 2007520757 A | 7/2007 |
| JP | 2007531032 A | 11/2007 |
| JP | 2007531033 A | 11/2007 |
| JP | 2008009327 A | 1/2008 |
| JP | 2009193014 A | 8/2009 |
| JP | 2010256895 A | 11/2010 |
| JP | 2011095723 A | 5/2011 |
| JP | 2012511084 A | 5/2012 |
| JP | 2012513044 A | 6/2012 |
| JP | 2013213964 A | 10/2013 |
| JP | 2014524040 A | 9/2014 |
| JP | 2015148673 A | 8/2015 |
| JP | 2017509030 A | 3/2017 |
| JP | 2017516155 A | 6/2017 |
| KR | 1020060129262 A | 12/2006 |
| WO | 2015037627 A1 | 3/2015 |
| WO | 2015134590 A1 | 9/2015 |

* cited by examiner

METHOD OF MAKING OPTICAL ARTICLES HAVING GRADIENT LIGHT INFLUENCING PROPERTIES

CROSS-REFERENCE TO RELATED APPLICATION

This application is the United States national phase of International Application No. PCT/US2015/058419 filed Oct. 30, 2015, the disclosure of which is hereby incorporated in its entirety by reference.

FIELD OF THE INVENTION

The present invention relates generally to making optical articles having a gradient light influencing properties.

BACKGROUND OF THE INVENTION

Polarizing optical articles, such as sunglasses, can reduce glare due to light reflected off of surfaces such as pavement, water, and buildings. Thus, the use of polarizing optical articles can enhance vision under glare conditions.

Linearly polarizing lenses, such as for sunglasses, are typically formed from stretched polymer sheets comprising a dye to give the lenses polarizing properties. Further, conventional sunglasses are typically tinted. The polarization and tinted effects on sunglasses can be formed by a number of types of dyes including, dichroic dyes, photochromic dyes, and photochromic-dichroic dyes. These types of dyes can be used individually, or in combination, to give the lenses the desired polarizing or tinted effects. Dichroic dyes generally provide a fixed polarization, fixed tint effect, meaning actinic radiation is not needed to make the lenses tinted and polarizing. Photochromic dyes generally provided reversible tinting, meaning that the lenses are tinted when exposed to actinic radiation, and revert to being untinted in the absence of actinic radiation. Photochromic-dichroic dyes generally provide reversible tinting and reversible polarization, based on exposure to actinic radiation.

Liquid crystal displays are prevalent in today's commonly used technology. They can be found, for instance, on tablets, cellphones, car dashboards, and screens at gas stations. Most of these liquid crystal display panels are linearly polarized panels aligned in the vertical direction. Therefore, those who wear the above-described polarized sunglasses often cannot see the contents of these liquid crystal display panels because of the cross polarization between the vertical alignment of the panels and the horizontal alignment of the sunglasses. Even liquid crystal displays having circularly polarized panels are harder to see while wearing polarizing sunglasses.

Accordingly, it would be advantageous to provide polarizing optical articles having more than one zone of different polarizing and optical properties to allow enhanced vision in more than one everyday environment.

SUMMARY OF THE INVENTION

The present invention is directed to a method of making an optical article having a gradient tint and a gradient polarization. The method can include contacting one or more dye compositions including at least one of a dichroic dye, a photochromic-dichroic dye, or any combination thereof, with an optical element having a continuous coating including at least one alignment zone. At least a portion of the dye composition can diffuse into the coating at a predetermined concentration gradient along at least a portion of the coating.

DESCRIPTION OF THE INVENTION

Figure 1:
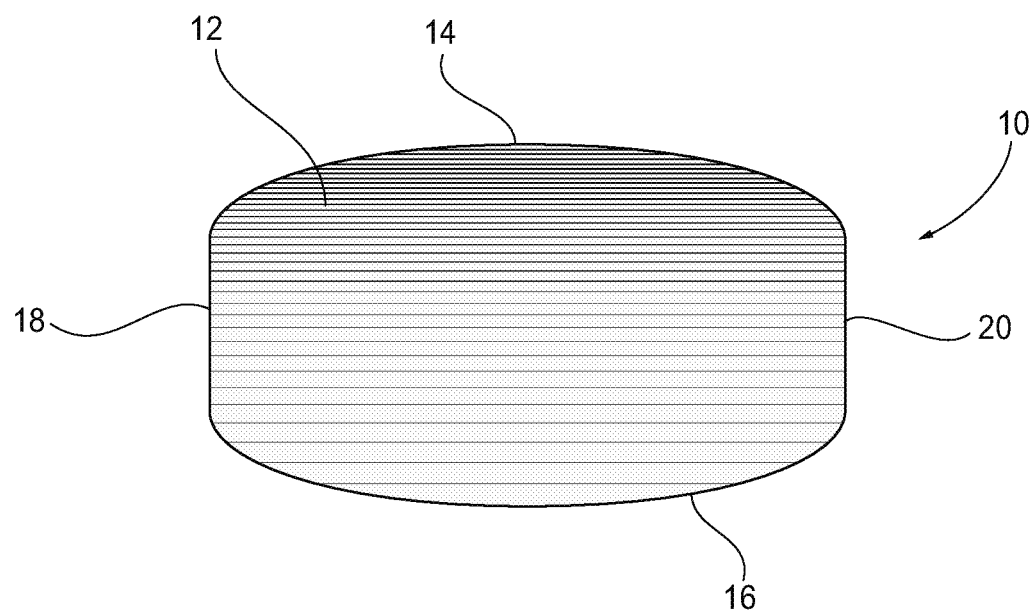
FIG. 1 illustrates an ophthalmic lens with uniform color/tint and gradient polarization over the entire top surface in accordance with the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

All documents, such as, but not limited to, issued patents and patent applications, referred to herein, and unless otherwise indicated, are to be considered to be "incorporated by reference" in their entirety.

The present invention is directed to optical articles and methods of making optical articles. The optical articles of the present invention comprise at least one optical element coated with at least one coating layer. As used herein, the term "optical" means pertaining to or associated with light and/or vision. For example, the optical article can include an optical element including, but not limited to, ophthalmic elements and devices, display elements and devices, windows, mirrors, and the like. The term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. As used herein the term "display" means the visible or machine-readable representation of information in words, numbers, symbols, designs, or drawings. Non-limiting examples of display elements and devices include screens, monitors, and security elements, such as security marks. As used herein the term "window" means an aperture adapted to permit the transmission of radiation therethrough. Non-limiting examples of windows include automotive and aircraft transparencies, filters, shutters, and optical switches. As used herein, the term "mirror" means a surface that specularly reflects a large fraction of incident light.

Further, the optical element can comprise a transparent optical element, a reflective optical element, or an optical element with both transparent and reflective properties. As used herein, the term "transparent" refers to a material that transmits rays of visible light in such a way that the human eye may see through the material distinctly, and the term "reflective" refers to a material that redirects visible light away from the material rather than transmitting or absorbing the visible light. To provide an optical element with at least some reflective properties, a reflective coating can be applied. For instance, a reflective aluminum coating can be applied to at least a portion of the optical element to prepare an optical security element with at least some reflective properties.

The optical elements that form the optical article can have various shapes including, but not limited to, round, flat, cylindrical, spherical, planar, substantially planar, plano-concave and/or plano-convex, curved, including, but not limited to, convex, and/or concave.

In general, the optical element can be made of various materials including, but not limited to, organic materials, inorganic materials, or combinations thereof (for example, composite materials).

Specific, non-limiting examples of organic materials that may be used to form the optical element disclosed herein include polymeric materials, for example, homopolymers and copolymers, prepared from the monomers and mixtures of monomers disclosed in U.S. Pat. Nos. 5,962,617 and in 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate)monomers, e.g., allyl diglycol carbonates such as diethylene glycol bis(allyl carbonate), which monomer is sold under the trademark CR-39 by PPG Industries, Inc.; polyurea-polyurethane (polyurea-urethane)polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or poly-episulfide monomers, either homopolymerized or co- and/or terpolymerized with polythiols, polyisocyanates, polyisothiocyanates, and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

Non-limiting examples of inorganic materials suitable for use in forming the optical elements include glasses, minerals, ceramics, and metals. For example, the optical element can comprise glass. As indicated above, a reflective coating or layer can be deposited or otherwise applied to a surface of an inorganic or an organic optical element to make it reflective or to enhance its reflectivity.

Still further, the optical elements can be untinted, tinted, linearly polarizing, circularly polarizing, elliptically polarizing, photochromic, or tinted-photochromic substrates. As used herein, with reference to optical element substrates, the term "untinted" means substrates that are essentially free of coloring agent additions (such as, but not limited to, conventional dyes) and have an absorption spectrum for visible radiation that does not vary significantly in response to actinic radiation. Further, with reference to optical element substrates, the term "tinted" means substrates that have a coloring agent addition (such as, but not limited to, conventional dyes) and an absorption spectrum for visible radiation that does not vary significantly in response to actinic radiation. It is appreciated that similar properties can be provided by applying a particular coating(s) onto the optical element, which is explained in further detail herein.

As used herein, the term "linearly polarizing" with reference to substrates refers to substrates that are adapted to linearly polarize radiation (i.e., confine the vibrations of the electric vector of light waves to one direction). As used herein, the term "circularly polarizing" with reference to substrates refers to substrates that are adapted to circularly polarize radiation. As used herein, the term "elliptically polarizing" with reference to substrates refers to substrates that are adapted to elliptically polarize radiation. Further, as used herein, with reference to substrates, the term "tinted-photochromic" means substrates containing a coloring agent addition as well as a photochromic material, and having an absorption spectrum for visible radiation that varies in response to at least actinic radiation. Thus, for example and without limitation, the tinted-photochromic substrate can have a first color characteristic of the coloring agent and a second color characteristic of the combination of the coloring agent the photochromic material when exposed to actinic radiation.

As indicated, the optical articles of the present invention also include at least one coating applied over at least a portion of the optical element. The coating can be applied over at least a portion of at least one major surface of the optical element. The coating can also be applied over the entire surface of the optical element.

As used herein, the term "coating" means a supported film derived from a flowable composition, which may or may not have a uniform thickness. Thus, a coating composition can be applied to the surface of the optical element and cured to form the coating. The term "curable," "cure," "cured," or similar terms, as used in connection with a cured or curable composition, is intended to mean that at least a portion of the polymerizable components that form the curable composition are at least partially polymerized.

The coating applied to the optical element comprises at least one anisotropic coating layer that includes at least one anisotropic material. In some examples, the anisotropic coating layer includes multiple anisotropic materials such as two or more, three or more, or four or more anisotropic materials. When multiple anisotropic materials are used, the anisotropic materials can be the same or different.

As used herein, the term "anisotropic" means having at least one property that differs in value when measured in at least one different direction and which are capable of self-assembly. Thus, "anisotropic materials" are materials that have at least one property that differs in value when measured in at least one different direction and which are capable of self-assembly. Non-limiting examples of anisotropic materials include liquid crystal materials.

Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface.

Further, a mesogen is the fundamental unit of a liquid crystal material, which induces the structural order in the liquid crystal material. The mesogenic moiety of the liquid crystal material typically comprises a rigid moiety which aligns with other mesogenic components of the liquid crystal material, thereby aligning the liquid crystal molecules in one specific direction. The rigid portion of the mesogen may consist of a rigid molecular structure, such as a mono- or polycyclic ring structure, including for example, a mono- or polycyclic aromatic ring structure.

Liquid crystal mesogens that are suitable for use with present invention include, but are not limited to, thermotropic liquid crystal mesogens and lyotropic liquid crystal mesogens. As used herein, a "thermotropic liquid crystal" means a liquid crystal that is ordered based on temperature, and a "lyotripic liquid crystal" means a liquid crystal that is ordered by the addition of solvent. Non-limiting examples of thermotropic liquid crystal mesogens include columatic (or rod-like) liquid crystal mesogens, discotic (or disc-like) liquid crystal mesogens, and cholesteric liquid crystal mesogens. Non-limiting examples of potential mesogens are set forth in greater detail, for example, in U.S. patent application Ser. No. 12/163,116, at paragraphs [0024]-[0047]; and include those described in Dennis, et al., "Flüssige Kristalle in Tabellen," VEB Deutscher Verlag Für Grundstoffindustrie, Leipzig, Germany, 1974 and "Flüssige Kristalle in Tabellen II," VEB Deutscher Verlag Für Grundstoffindustrie, Leipzig, Germany, 1984, the disclosures of each of which are incorporated by reference herein.

The liquid crystal materials comprising one or more mesogens can include liquid crystal polymers, liquid crystal pre-polymers, and liquid crystal monomers. As used herein the term "pre-polymer" means partially polymerized materials. Further, the term "polymer" means homopolymers (e.g., prepared from a single monomer species), copolymers (e.g., prepared from at least two monomer species), and graft polymers.

Liquid crystal monomers that are suitable for use as anisotropic materials include, but not limited to, mono-functional, as well as multi-functional liquid crystal monomers. Further, the liquid crystal monomer can be a polymerizable liquid crystal monomer, and can further be a photo-polymerizable and/or thermo-polymerizable liquid crystal monomer. As used herein, the term "photo-polymerizable" means a material, such as a monomer, a pre-polymer, or a polymer, that can be cross-linked on exposure to actinic radiation. As used herein, the term "actinic radiation" means electromagnetic radiation and includes, for example, and without limitation, visible and ultraviolet (UV) radiation. Further, the term "thermo-polymerizable" means a material, such as a monomer, a pre-polymer, or a polymer, that can be cross-linked on exposure to heat.

Non-limiting examples of liquid crystal monomers suitable for use as anisotropic materials include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof.

Liquid crystal polymers and pre-polymers that are suitable for use as anisotropic materials include, but are not limited to, thermotropic liquid crystal polymers and pre-polymers, and lyotropic liquid crystal polymers and pre-polymers. Further, the liquid crystal polymers and pre-polymers can be main-chain polymers and pre-polymers or side-chain polymers and pre-polymers. In main-chain liquid crystal polymers and pre-polymers, rod- or disc-like liquid crystal mesogens are primarily located within the polymer backbone. In side-chain polymers and pre-polymers, the rod- or disc-like liquid crystal mesogens primarily are located within the side chains of the polymer. Additionally, the liquid crystal polymer or pre-polymer can be photo-polymerizable.

Non-limiting examples of liquid crystal polymers and pre-polymers that are suitable for use as anisotropic materials include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof.

The anisotropic coating layer of the present invention can also include at least one dichroic material and/or at least one photochromic-dichroic material, and optionally, at least one photochromic material, and combinations thereof. The dichroic material, and photochromic-dichroic material can be aligned in the direction of the anisotropic materials. For example, a dichroic material, and/or photochromic-dichroic material can be incorporated into the anisotropic coating layer such that the dichroic material and/or photochromic-dichroic material are aligned in the same direction as the surrounding anisotropic materials. Thus, the aligned anisotropic materials act as an alignment medium to align the dichroic materials and/or photochromic-dichroic materials.

As used herein the term "photochromic" means having an absorption spectrum for at least visible radiation that varies in response to at least actinic radiation. Further, the term "photochromic materials" includes thermally reversible photochromic materials and non-thermally reversible photochromic materials, which are generally capable of converting from a first state, for example a "clear state" in at least the visible spectrum, to a second state, for example a "colored state" in at least the visible spectrum, in response to thermal energy and/or actinic radiation, and reverting back to the first state when not exposed to thermal energy and/or actinic radiation, provided that at least one of the changes is in response to actinic radiation. Although not limiting herein, photochromic materials used with the present invention can change from a clear state to a colored state in at least the visible spectrum, or they may change from one colored state to another colored state in at least the visible spectrum.

Furthermore, the term "dichroic" means capable of absorbing one of two orthogonal plane polarized components of at least transmitted radiation more strongly than the other. One measure of how strongly the dichroic material absorbs one of two orthogonal plane-polarized components is the "absorption ratio." As used herein, the term "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance.

While dichroic materials absorb one of two orthogonal plane-polarized components of transmitted radiation more strongly than the other, the molecules of the dichroic material must be suitably positioned or arranged to achieve a net polarization of transmitted radiation. Thus, when incorporated into the anisotropic coating layer, at least a portion of the at least one dichroic material can be brought into suitable position or arrangement (i.e., ordered or aligned) such that an overall polarization effect can be achieved.

Moreover, the term "photochromic-dichroic material" refers to materials that display photochromic properties and dichroic properties in response to at least actinic radiation. For example, the anisotropic coating layer can include at least one photochromic-dichroic material that is adapted to reversibly switch from a first optically clear, non-polarizing state in at least the visible spectrum to a second colored, polarizing state in at least the visibly spectrum in response to at least actinic radiation. As such, if the optical element is an ophthalmic lens with a coating layer comprising the photochromic-dichroic material, the lens can reversibly switch from an optically clear, non-polarizing state when the wearer is not exposed to actinic radiation, for example, out of the sunlight, to a colored, polarizing state when the wearer is exposed to actinic radiation, for example, from sunlight.

Non-limiting examples of organic photochromic compounds include benzopyrans, naphthopyrans (for example naphtho[1,2-b]pyrans and naphtho[2,1-b]pyrans) spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57 and in U.S. Pat. No. 5,658,501 at column 1, line 64 to column 13, line 36, which disclosures are incorporated herein by reference. Additional non-limiting examples of organic photochromic compounds that may be used include oxazines, such as benzoxazines, naphthoxazines, and spirooxazines. Other non-limiting examples of photochromic compounds that may be used include: fulgides and fulgimides, for example 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent Application No. 2003/0174560 from paragraph [0025] to [0086], which disclosure is incorporated herein by reference; and combinations or mixtures of any of the aforementioned photochromic materials/compounds.

Further, suitable dichroic materials that can be used with the present invention include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthraquinone and (poly)anthraquinones, anthrapyrimidinones, iodine and iodates, and combinations thereof.

Further still, non-limiting examples of photochromic-dichroic materials include the photochromic-dichroic materials described in U.S. Patent Application Publication Nos. 2005/0004361, at paragraph 27 to paragraph 158, which disclosure is hereby specifically incorporated herein by reference.

Other non-limiting examples of suitable photochromic materials, dichroic materials, and photochromic-dichroic materials can be found in U.S. patent application Ser. No. 12/329,197, filed Dec. 8, 2008, entitled "Alignment Facilities for Optical Dyes" at paragraphs [0090]-[0102] and the references cited therein; and U.S. patent application Ser. No. 12/163,180, filed Jun. 27, 2008 entitled "Formulations Comprising Mesogen Containing Compounds" at paragraphs [0064]-[0084] and the references cited therein, the disclosure of each of which is incorporated by reference herein. Moreover, non-limiting examples of photochromic materials that can be used are further described in U.S. Pat. No. 7,044,599, at column 9, line 60 to column 11, line 3, which disclosure is hereby specifically incorporated herein by reference. Non-limiting examples of dichroic materials that can be used are further described in U.S. Pat. No. 7,044,599, at column 7, lines 18-56, which disclosure is hereby specifically incorporated herein by reference. In addition, other non-limiting examples of photochromic-dichroic materials are further described in U.S. Patent Application Publication No. 2005/0012998 A1, at paragraph 11 to paragraph 442, which disclosures is hereby specifically incorporated herein by reference.

The anisotropic coating layer can also include additional additives. For example, the anisotropic coating layer can also include mesogenic stabilizers, alignment promoters, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), conventional dyes, and combinations thereof. As used herein, "conventional dyes" refers to dyes that provide color/tint but which not provide polarization or a reversible change.

As used herein, the term "alignment promoter" means an additive that can facilitate at least one of the rate and uniformity of the alignment of a material to which it is added. Non-limiting examples of alignment promoters include those described in U.S. Pat. No. 6,338,808 at column 1, line 66 to column 35, line 23, and U.S. Patent Application Publication No. 2002/0039627 at paragraphs [0036] to [0286], which are hereby specifically incorporated by reference herein.

Non-limiting examples of kinetic enhancing additives include epoxy-containing compounds, organic polyols, and/or plasticizers. More specific examples of such kinetic enhancing additives are disclosed in U.S. Pat. No. 6,433,043 at column 2, line 57 to column 13, line 54, and U.S. Patent Application Publication No. 2003/0045612 at paragraphs [0012] to [0095], which are hereby specifically incorporated by reference herein.

Non-limiting examples of photoinitiators include cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator includes a visible light photoinitiator. Non-limiting examples of suitable visible light photoinitiators are set forth at column 12, line 11 to column 13, line 21 of U.S. Pat. No. 6,602,603, which is specifically incorporated by reference herein.

Non-limiting examples of thermal initiators include organic peroxy compounds and azobis(organonitrile) compounds. Specific non-limiting examples of organic peroxy compounds that are useful as thermal initiators include peroxymonocarbonate esters, such as tertiarybutylperoxy isopropyl carbonate; peroxydicarbonate esters, such as di(2-ethylhexyl)peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Non-limiting examples of azobis (organonitrile) compounds that can be used as thermal initiators include azobis(isobutyronitrile), azobis(2,4-dimethylvaleronitrile) or a mixture thereof.

Non-limiting examples of polymerization inhibitors include: nitrobenzene, 1,3,5,-trinitrobenzene, p-benzoquinone, chloranil, DPPH, FeCl3, CuCl2, oxygen, sulfur, aniline, phenol, p-dihydroxybenzene, 1,2,3-trihydroxybenzene, and 2,4,6-trimethylphenol.

Non-limiting examples of solvents include those that will dissolve solid components of the coating, that are compatible with the coating and the elements and substrates, and/or that can ensure uniform coverage of the exterior surface(s) to which the coating is applied. Potential solvents include, but are not limited to, the following: N-methyl-2-pyrrolidone, propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

As indicated, the anisotropic coating layer comprises anisotropic materials that can be aligned in a particular direction. In some examples, the anisotropic materials are aligned by an alignment coating layer that is positioned between the optical element and the anisotropic coating layer. Thus, the optical article of the present invention can comprise an optical element, an alignment coating layer applied over at least a portion of the optical element, and an anisotropic coating layer applied over at least a portion of the alignment coating layer.

The alignment coating layer used with the present invention comprises materials that can be aligned in a particular direction. For example, the alignment coating layer can comprise a rubbing material or a photo-alignment material that can be aligned in various directions including, but not limited to, a parallel orientation, elliptical orientation, splay orientation, vertical orientation, helical orientation, or any combination thereof.

As used herein, the term "rubbing material" means a material that can be at least partially ordered by rubbing at least a portion of a surface of the material with another suitably textured material. For instance, the rubbing material can be rubbed with a suitably textured cloth or a velvet brush. Non-limiting examples of rubbed-orientation materials include (poly)imides, (poly)siloxanes, (poly)acrylates, (poly)coumarines, and combinations thereof.

As used herein, the term "photo-alignment material" refers to a material that can be aligned though exposure to polarized radiation such as polarized UV radiation. The photo-alignment material can comprise photochemically active chromophores. As used herein, the phrase "photochemically active chromophore" includes structures or portions of the molecule or polymer which chemically react (such as with themselves or with another active moiety, for example another photochemically active chromophore) upon the absorption of actinic radiation. The photochemically active chromophore may undergo a photochemical cis/trans-isomerization, a photochemical [2+2] cycloaddition (leading to a cross-linking of the polymer or oligomer), a photochemical decomposition or a photochemical rearrangement.

Non-limiting examples of suitable photochemically active chromophores include, but are not limited to, dimerizable substituted or unsubstituted cinnamate or dimerizable dimerizable coumarin, cis/trans isomerizable substituted or unsubstituted azo, photochemically decomposable polyimide, and photochemically rearrangeable substituted or unsubstituted aromatic esters. Cinnamates and coumarins may react upon exposure to actinic radiation to undergo a [2+2] cycloaddition as described in "Alignment Technologies and Applications of Liquid Crystal Devices," Kohki Takotah et al., Taylor and Francis, New York, 2005, pages 61-63, which disclosure is incorporated herein by this reference. Non-limiting examples of suitable cinnamates may be found in U.S. Pat. No. 5,637,739 at column 6, lines 19 to 32 and U.S. Pat. No. 7,173,114 at column 3, line 13 to column 5, line 2 and coumarins may be found in U.S. Pat. No. 5,231,194 at column 1, line 37 to column 3, line 50; U.S. Pat. No. 5,247,099 at column 1, line 66 to column 4 line 28; U.S. Pat. No. 5,300,656 at column 1, line 13 to column 10, line 15; and U.S. Pat. No. 5,342,970 at column 1, line 6 to column 7, line 34, the disclosures of each of which are incorporated herein by reference.

Further examples of photochemically active chromophores include: a photoisomerizable azo compound such as Poly((n-butyl methacrylate-co-(E)-4-(phenyldiazenyl) phenyl methacrylate)-b-styrene) described in Macromol. Chem. Phys. 2009, 210, pages 1484-1492; photodegradable polyimides such as Poly(2-methyl-6-(4-(p-tolyloxy)phenyl) pyrrolo[3,4-f]isoindole-1,3,5,7(2H,6H)-tetraone), Poly(5-(2-(1,3-dioxo-2-(4-(p-tolyloxy)phenyl)isoindolin-5-yl)-1,1, 1,3,3,3-hexafluoropropan-2-yl)-2-methylisoindoline-1,3-dione), Poly(5-(2-(1,3-dioxo-2-(4-(2-(p-tolyl)propan-2-yl) phenyl)isoindolin-5-yl)-1,1,1,3,3,3-hexafluoropropan-2-yl)-2-methylisoindoline-1,3-dione); and Poly(5-(1,1,1,3,3,3-hexafluoro-2-(2-(4-(1,1,1,3,3,3-hexafluoro-2-(p-tolyl) propan-2-yl)phenyl)-1,3-dioxoisoindolin-5-yl)propan-2-yl)-2-methylisoindoline-1,3-dione) described in Macromolecules 1994, 27, pages 832-837; a photoreactive polyimide such as (2E,2'E)-4-(5-(1,1,1,3,3,3-hexafluoro-2-(2-methyl-1,3-dioxoisoindolin-5-yl)propan-2-yl)-1,3-dioxoisoindolin-2-yl)-4'-methyl-[1,1'-biphenyl]-3,3'-diyl bis (3-phenylacrylate) described in Macromolecules 2003, 36, pages 6527-6536; a photodecomposable polyimide such as 7-methyl-2-(4-(4-methylbenzyl)phenyl)tetrahydro-1H-5,9-methanopyrido[3,4-d]azepine-1,3,6,8(2H,4H,7H)-tetraone and 2-methyl-5-(4-(4-(2-(4-(p-tolyloxy)phenyl)propan-2-yl)phenoxy)phenyl)hexahydrocyclobuta[1,2-c:3,4-c']dipyrrole-13 (2H,3 aH)-dione described in the The Liquid Crystal Book Series: Alignment Technologies and Application of Liquid Crystal Devices, by K. Takatoh et. al., 2005, Taylor and Francis, page 63; and aromatic esters capable of undergoing a Photo-Fries rearrangement include: Poly(5-methacrylamidonaphthalen-1-yl methacrylate); Poly(4-methacrylamidonaphthalen-1-yl methacrylate); Poly(4-methacrylamidophenyl methacrylate); Poly(4-methacrylamidophenethyl methacrylate); and Poly(4-(2-methacrylamidoethyl)phenyl methacrylate) described in Molecular Crystal and Liquid Crystal, 2007, Vol. 479 page 121. The disclosures of each of the aforementioned articles and text related to photochemically active chromophores are incorporated herein by reference.

Other non-limiting examples of suitable photo-alignment materials include (co)polymeric structures comprising at least one photochemically active chromophore, such as any of those previously described, and at least one adhesion promoter group. As used herein, an "adhesion promoter" refers to a group or structure that improves adhesion between the (co)polymeric structure and a substrate, such as an optical element, to which it is coated onto or to polymeric films that are coated onto the surface of the polymer containing the adhesion promoter. Adhesion promoters may act by forming an at least partial attractive force on a molecular or atomic level between the (co)polymer and the substrate or subsequent coating. Examples of attractive forces include covalent bonds, polar covalent bonds, ionic bonds, hydrogen bonds, electrostatic attractions, hydrophobic interactions, and van der Waals attractions. Within the structure of the copolymer, the attractive interaction between a plurality of adhesion promoter groups and the substrate surface or subsequent coating material results in an improved adhesion between the copolymer and the substrate surface and/or the subsequent coating.

Non-limiting examples of suitable structures for adhesion promoter groups that can be used to form the (co)polymeric structures include hydroxy, carboxylic acid, anhydride, isocyanato, blocked isocyanato, thioisocyanato, blocked thioisocyanato, amino, thio, organofunctional silane, organofunctional titanate, organofunctional zirconate, and epoxy, wherein each organofunctional group is independently selected from vinyl, allyl, vinyl-functional hydrocarbon radicals, epoxy-functional hydrocarbon radicals, allyl-functional hydrocarbon radicals, acryloyl-functional hydrocarbon radicals, methacryloyl-functional hydrocarbon radicals, styryl-functional hydrocarbon radicals, mercapto-functional hydrocarbon radicals or combinations of such organofunctional groups, said hydrocarbon radicals being selected from C1-C20 alkyl, C2-C20 alkenyl, C2-C20 alkynyl, C1-C20 alkoxy, C1-C20 alkyl(C1-C20)alkoxy, C1-C20 alkoxy(C1-C20)alkyl, aryl, heteroaryl, and combinations of such hydrocarbon radicals; provided that when the adhesion promoter group is hydroxy or carboxylic acid, the (co)polymer further comprises at least one other adhesion promoter group; such as, but not limited to those promoters disclosed in U.S. Pat. No. 6,025,026 at column 6, line 5 to column 8, line 65; U.S. Pat. No. 6,150,430 at column 2, line 59 to column 5, line 44; and U.S. Pat. No. 7,410,691 at column 6, line 4 to column 8, line 19; which disclosures are incorporated herein by reference. As used herein, the term "blocked" when used in reference to isocyanato or thioisocyanato groups refers to a structure where the isocyanato or thioisocyanato group has been reversibly reacted with a group to protect the isocyanato or thioisocyanato group from reacting until the blocking group is removed. Generally, compounds used to block isocyanato or thioisocyanato groups may be organic compounds that have active hydrogen atoms, for example, but not limited to, volatile alcohols, epsilon-caprolactam or ketoxime compounds. Non-limiting examples of blocking groups include amines, hydrooxamic esters, substituted or unsubstituted pyrazol groups, phenols, cresol, nonylphenol, caprolactam, triazole, imidazoline, oxime, formate and diacetone, including those described in X. Tassel et al., "A New Blocking Agent of Isocyanates" European Polymer Journal, 2000, 36, 1745-1751 and Z. W. Wicks Jr., Progress in Organic Coatings, 1975, 3, 73-99, which disclosures are incorporated herein by this reference.

Specific non-limiting examples of such (co)polymeric structures are described in U.S. Patent Application Publication No. 2011/0135850 at paragraphs [0031]-[0053] and [0091]-[0102], the disclosure of which is incorporated by reference herein. It is appreciated that the alignment coating layer can include any of the additional additives previously described with reference to the anisotropic coating layer.

As previously noted, an anisotropic coating layer, and, optionally, an alignment coating layer, such as previously described, can be applied over at least a portion of a surface of an optical element. The anisotropic layer or the alignment coating layer can be applied directly over at least a portion of the surface of the optical element. When an alignment coating layer is formed over at least a portion of the surface of the optical element, an anisotropic coating layer can be applied directly over the alignment coating layer such that the anisotropic materials and additional materials such as dichroic, photochromic, and photochromic-dichroic materials for example, are aligned by the alignment coating layer. As used herein, the phrase "applied directly over" means that a coating layer is formed over the surface of an optical element or over the surface of another coating layer without any other component positioned in between such as another coating layer.

Generally the thickness of at least the anisotropic coating layer can be any thickness necessary to achieve the desired thickness for the optical article of manufacture. For example, the thickness of at least the anisotropic coating layer can be from 0.1 microns to 1 millimeter, from 5 microns to 50 microns, or from 10 microns to 30 microns. The alignment coating layer can also have the same thickness as the anisotropic coating layer.

Additional coating layers can also be used with the anisotropic and alignment coating layers. That is, one or more additional layers may be applied onto the surface of the optical element, onto the surface of the anisotropic coating layer, and/or onto the surface of the alignment coating layer. Non-limiting examples of additional coating layers include a separate tie layer, primer layer, abrasion resistant coating layer, hard coating layer, protective coating layer, reflective coating layer, photochromic coating layer, dichroic coating layer, photochromic-dichroic coating layer, anti-reflective coating layer, linearly polarizing coating layer, circularly polarizing coating layer, elliptically polarizing coating layer, transitional coating layer, compatibilizing coating layer, functional organic coating layer, retarder layer, or combinations thereof. A description and non-limiting examples of at least some of these additional layers is described in U.S. Patent Application Publication No. 2011/0135850 at paragraphs [0060]-[0064], the disclosure of which is incorporated by reference herein.

Moreover, the anisotropic coating layer, and optionally the alignment coating layer, can be applied to an optical element to form an optical article with one or more light influencing properties. As used herein, the term "light influencing property" refers to the capability of an optical article to exhibit one or more optical properties when light contacts or traverses through the optical article. Non-limiting examples of light influencing properties include color/tint, polarization, photochromic and/or photochromic-dichroic reversible changes, or combinations thereof. The anisotropic coating layer, and optionally the alignment coating layer, can be applied over an optical element to form multiple light influencing zones with different light influencing properties. Further, the anisotropic coating layer, and optionally the alignment coating layer, can be applied over an optical element in a predetermined pattern to form a light-influencing zone in the predetermined pattern.

In some examples, an anisotropic coating layer, and optionally an alignment coating layer, are applied over an optical element to form at least one light influencing zone with at least one uniform or gradient light influencing property. For instance, an anisotropic coating layer, and optionally an alignment coating layer, are applied over an optical element to form at least one light influencing zone with uniform polarization or gradient polarization. As used herein, "uniform polarization" refers to a constant magnitude or degree of polarization throughout the at least one light influencing zone, and "gradient polarization" refers to an increase or decrease in the magnitude or degree of polarization throughout the at least one light influencing zone. To provide uniform polarization, the anisotropic coating layer can have the same amount of aligned dichroic materials and/or the same amount of aligned photochromic-dichroic materials throughout the at least one light influencing zone. Further, to provide gradient polarization, the anisotropic coating layer can have different amounts of aligned dichroic materials and/or different amounts of aligned photochromic-dichroic materials throughout the at least one light influencing zone. The amount of aligned dichroic and/or photochromic-dichroic materials can be varied by incorporating different quantities of dichroic and/or photochromic-dichroic materials throughout the at least one light influencing zone, or by incorporating similar quantities of dichroic and/or photochromic-dichroic materials but then aligning different amounts of the dichroic and/or photochromic-dichroic materials throughout the at least one light influencing zone.

The anisotropic coating layer, and optionally an alignment coating layer, can also be applied over an optical element to form at least one light influencing zone with uniform color/tint or gradient color/tint. As used herein, "uniform color/tint" refers to a constant magnitude or degree of color/tint throughout the at least one light influencing zone, and "gradient color/tint" refers to an increase or decrease in the magnitude or degree of color/tint throughout the at least one light influencing zone. To provide uniform color/tint, the anisotropic coating layer can have the same amount of dichroic materials, photochromic materials, photochromic-dichroic materials, and/or conventional dyes throughout the at least one light influencing zone. Further, to provide gradient color/tint, the anisotropic coating layer can have different amounts of dichroic materials, photochromic materials, photochromic-dichroic materials, and/or conventional dyes throughout the at least one light influencing zone.

The anisotropic coating layer, and optionally an alignment coating layer, can also be applied over an optical element to form at least one light influencing zone with a uniform photochromic and/or photochromic-dichroic reversible change or a gradient photochromic and/or photochromic-dichroic reversible change. As used herein, "uniform photochromic and/or photochromic-dichroic reversible change" refers to a constant magnitude or degree in a color/tint and/or polarization change throughout the at least one light influencing zone when exposed to at least actinic radiation, and "gradient photochromic and/or photochromic-dichroic reversible change" refers to an increase or decrease in the magnitude or degree of a color/tint and/or polarization change throughout the at least one light influencing zone when exposed to at least actinic radiation. To provide a uniform photochromic and/or photochromic-dichroic reversible change, the anisotropic coating layer can have the same amount of photochromic materials and/or photochromic-dichroic materials throughout the at least one light influencing zone. Further, to provide a gradient photochromic and/or photochromic-dichroic reversible change, the anisotropic coating layer can have different amounts of photochromic materials and/or photochromic-dichroic materials throughout the at least one light influencing zone.

As will be appreciated, the use of photochromic materials and photochromic-dichroic materials to provide uniform or gradient polarization and/or color/tint will also provide a uniform or gradient photochromic and/or photochromic-dichroic reversible change. Thus, by using photochromic materials and/or photochromic-dichroic materials, a light influencing zone with at last two different light influencing properties can be formed. It is also appreciated that the anisotropic coating layer, and optionally an alignment coating layer, can be applied over an optical element to form one or more light influencing zones that independently comprise any combination of uniform or gradient light influencing properties.

As indicated, the optical article can comprise two or more light influencing zones with different light influencing properties. As such, the optical article of the present invention can comprise two or more light influencing zones with different polarization properties, different color/tint, different photochromic and/or photochromic-dichroic reversible changes, or any combination thereof.

In some examples, the optical article comprises at least two light influencing zones with different polarization properties. For instance, the optical article can include: (i) at least a first light influencing zone with a polarization alignment that is different than the polarization alignment of at least a second light influencing zone; (ii) at least a first light influencing zone with a greater or lesser magnitude/degree of polarization than the polarization of at least a second light influencing zone; (iii) at least a first light influencing zone with uniform polarization and at least a second light influencing zone with no polarization; (iv) at least a first light influencing zone with a gradient polarization and at least a second light influencing zone with no polarization; (v) at least a first light influencing zone with a gradient polarization and at least a second light influencing zone with uniform polarization; (vi) at least a first light influencing zone with a first gradient polarization and at least a second light influencing zone with a second gradient polarization that is different than the first gradient polarization such as, for example, a different degree/magnitude of polarization change, a different polarization alignment, or a different directional change in polarization magnitude/degree; or (vii) any combinations thereof.

Moreover, the optical article can also comprise at least two light influencing zones with different photochromic and/or photochromic-dichroic reversible changes. For example, the optical article can include: (i) at least a first light influencing zone that comprises photochromic materials and at least a second light influencing zone with no photochromic materials; (ii) at least a first light influencing zone that comprises photochromic-dichroic materials and at least a second light influencing zone with no photochromic-dichroic materials; (iii) at least a first light influencing zone that comprises a gradient photochromic reversible change and at least a second light influencing zone with a uniform photochromic reversible change; (iv) at least a first light influencing zone that comprises a gradient photochromic-dichroic reversible change and at least a second light influencing zone with a uniform photochromic-dichroic reversible change; or (v) any combination thereof.

The optical article can further comprise at least two light influencing zones with different color/tint properties. For example, the optical article can include: (i) at least a first light influencing zone with a greater or lesser magnitude/degree of color/tint than the color/tint of at least a second light influencing zone; (ii) at least a first light influencing zone with a different hue of color/tint than the hue of color/tint of at least a second light influencing zone; (iii) at least a first light influencing zone with uniform color/tint and at least a second light influencing zone with no color/tint; (iv) at least a first light influencing zone with a gradient color/tint and at least a second light influencing zone with no color/tint; (v) at least a first light influencing zone with a gradient color/tint and at least a second light influencing zone with uniform color/tint; (vi) at least a first light influencing zone with a first gradient color/tint and at least a second light influencing zone with a second gradient color/tint that is different than the first gradient color/tint such as, for example, a different magnitude of color/tint change or a different spatial directional change in color/tint; or (vii) any combinations thereof.

An optical article can be formed with any combination of the previously described non-limiting light influencing zones and properties. Further, the optical article can comprise any desired number of light influencing zones including, but not limited to, two or more, three or more, or four or more light influencing zones. The number and types of light influencing zones can be selected based on the desired use of the optical article. For example, an optical article that is used as an ophthalmic lens can have a dark, strongly polarizing first zone that sufficiently blocks sunlight and selectively reduces glare, and a lighter, lesser polarizing second zone for reading and viewing digital displays in an automobile, airplane, or boat. Specific non-limiting examples of ophthalmic lenses with one or more light influencing zones are further illustrated in FIGS. 1-5.

As shown in FIG. 1, an anisotropic coating layer, and optionally an alignment coating layer, can be applied over an ophthalmic lens 10 having a top surface 12 formed between an upper edge 14, a lower edge 16, and two lateral edges 18 and 20 extending from the upper edge 14 to the lower edge 16. As shown in FIG. 1, the anisotropic coating layer provides uniform color/tint and gradient polarization over the entire top surface 12 of the ophthalmic lens 10 such that the magnitude or degree of polarization decreases from the upper edge 14 to the lower edge 16 and the magnitude or degree of color/tint remains same from the upper edge 14 to the lower edge 16.

Figure 2:
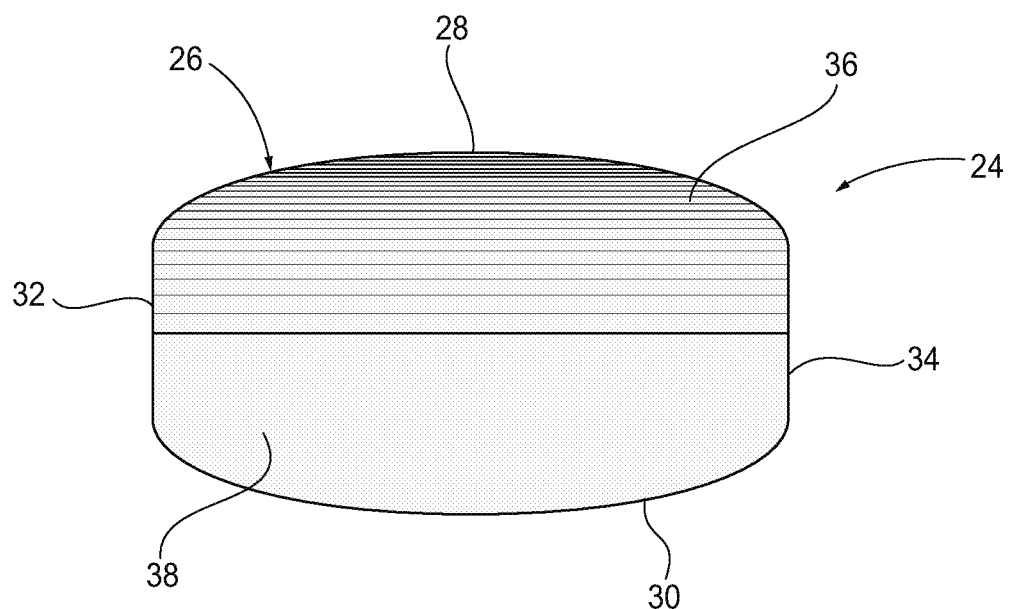
FIG. 2 illustrates an ophthalmic lens having a first light influencing zone with a high degree of horizontal polarization formed over an upper portion of the top surface and a second light influencing zone with no polarization formed over a lower portion of the top surface in accordance with the present invention.

Referring to FIG. 2, an anisotropic coating layer, and optionally an alignment coating layer, are applied over an ophthalmic lens 24 having a top surface 26 formed between an upper edge 28, a lower edge 30, and two lateral edges 32 and 34 extending from the upper edge 28 to the lower edge 30. As further shown in FIG. 2, a first light influencing zone 36 with high degree of horizontal polarization is formed over an upper portion of the top surface 26 of the lens 24 and a second light influencing zone 38 with no polarization is formed over a lower portion of the top surface 26 of the lens 24.

Figure 3:
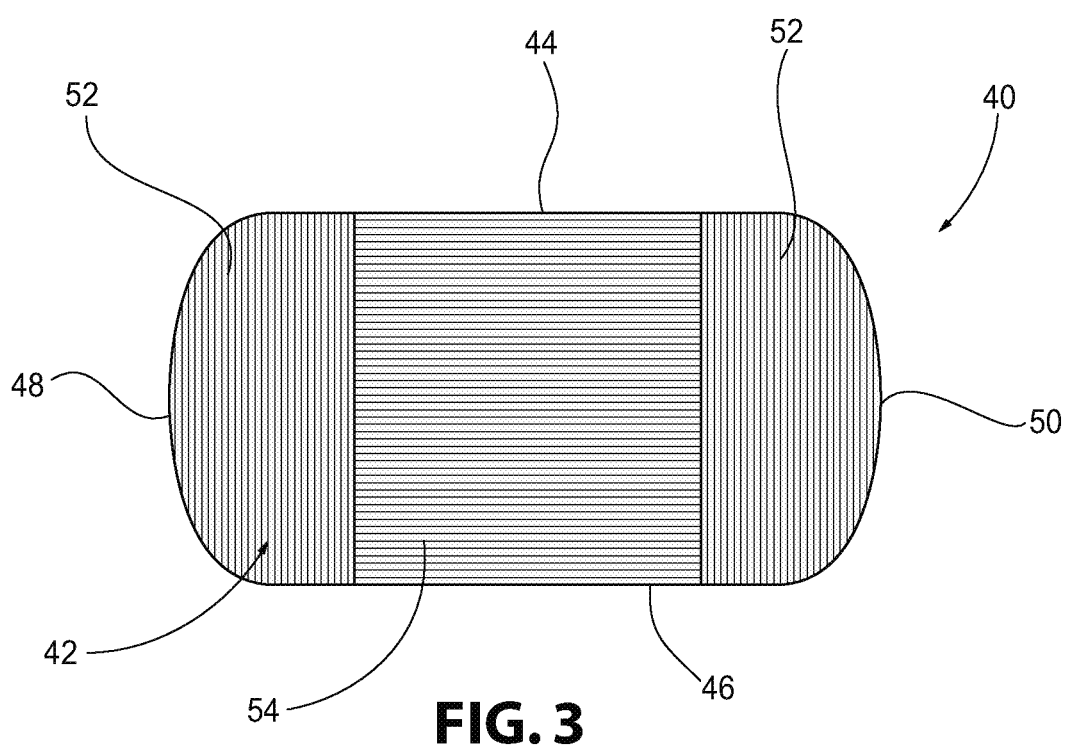
FIG. 3 illustrates an ophthalmic lens having first light influencing zones with vertical polarization formed over the side portions of the top surface and a second light influencing zone with horizontal polarization formed over a central portion of the top surface between the first light influencing zones in accordance with the present invention.

As shown in FIG. 3, an anisotropic coating layer, and optionally an alignment coating layer, are applied over an ophthalmic lens 40 having a top surface 42 formed between an upper edge 44, a lower edge 46, and two lateral edges 48 and 50 extending from the upper edge 44 to the lower edge 46. As further shown in FIG. 3, first light influencing zones 52 with vertical polarization are formed over the side portions of the top surface 42 adjacent to the lateral edges 48 and 50, and a second light influencing zone 54 with horizontal polarization is formed over a central portion of the top surface 26 of the lens 24 between the upper edge 44, the lower edge 46, and the first light influencing zones 52.

Figure 4:
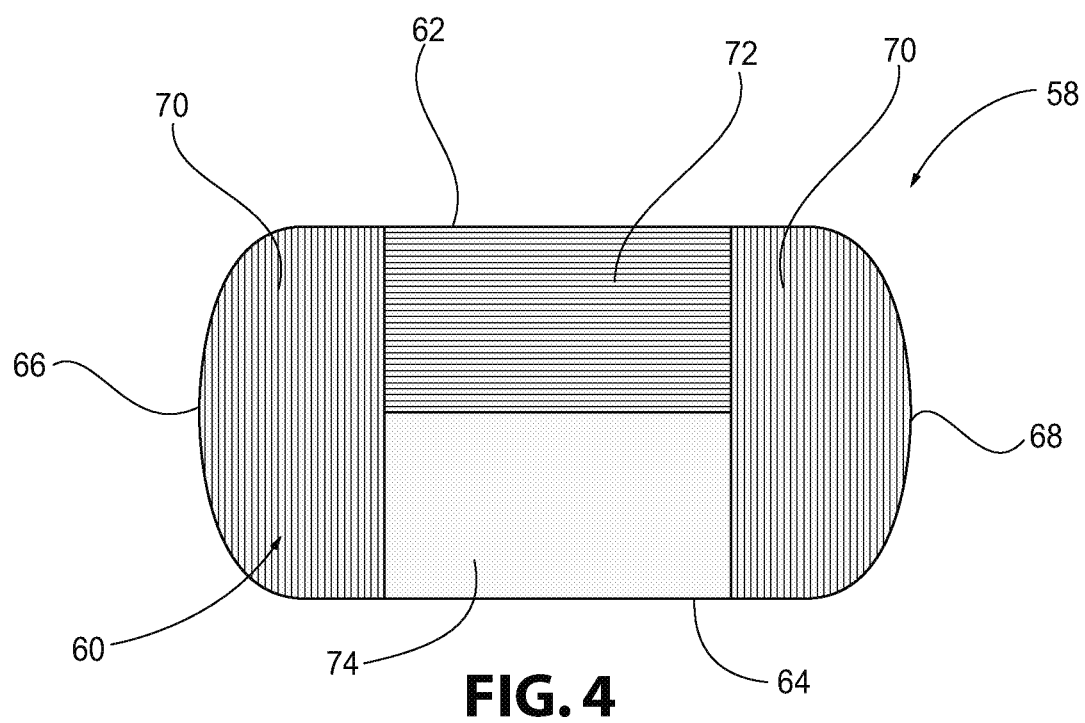
FIG. 4 illustrates an ophthalmic lens having first light influencing zones with vertical polarization formed over the side portions of the top surface, a second light influencing zone with horizontal polarization formed over an upper portion of the top surface between the first light influencing zones, and a third light influencing zone with no polarization formed over a lower portion of the top surface between the first light influencing zones in accordance with the present invention.

FIG. 4 illustrates an anisotropic coating layer, and optionally an alignment coating layer, applied over an ophthalmic lens 58 having a top surface 60 formed between an upper edge 62, a lower edge 64, and two lateral edges 66 and 68 extending from the upper edge 62 to the lower edge 64. As shown in FIG. 4, first light influencing zones 70 with vertical polarization are formed over the side portions of the top surface 60 adjacent to the lateral edges 66 and 68, a second light influencing zone 72 with horizontal polarization is formed over an upper portion of the top surface 60 of the lens 58 between the first light influencing zones 70, and a third light influencing zone 74 with no polarization is formed over a lower portion of the top surface 60 of the lens 58 between the first light influencing zones 70.

Figure 5:
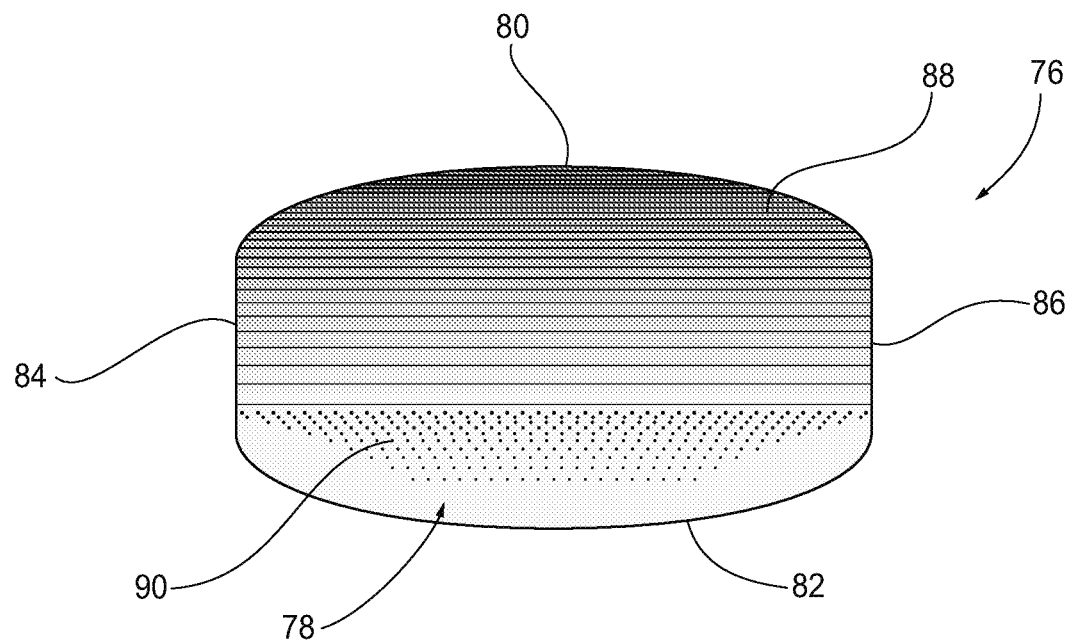
FIG. 5 illustrates an ophthalmic lens having a first light influencing zone with gradient polarization and gradient tint formed over an upper portion of the top surface and a second light influencing zone with a lesser degree/magnitude of gradient polarization and gradient tint formed over a lower portion of the top surface.

FIG. 5 illustrates an anisotropic coating layer, and optionally an alignment coating layer, applied over an ophthalmic lens 76 having a top surface 78 formed between an upper edge 80, a lower edge 82, and two lateral edges 84 and 86 extending from the upper edge 80 to the lower edge 82. As shown in FIG. 5, a first light influencing zone 88 with gradient polarization and gradient tint is formed over an upper portion of the top surface 78 of the lens 76 and a second light influencing zone 90 with gradient polarization and gradient tint is formed over a lower portion of the top surface 78 of the lens 76. Further, the first light influencing zone 88 shown in FIG. 5 has a greater degree of polarization and tint than the second light influencing zone 90. This arrangement can provide a gradual change in polarization and tint from the upper edge 80 to the bottom edge 82 with two different light influencing zones.

As previously indicated, the present invention is also directed to a method of preparing optical articles including, but not limited to, any of the optical articles previously described. The optical articles can be prepared by forming an anisotropic coating layer and, optionally, an alignment coating layer over an optical element. A variety of methods can be used to form these coating layers including, but not limited to, imbibing, overmolding, spin coating, spray coating, spray and spin coating, curtain coating, flow coating, dip coating, injection molding, casting, roll coating, spread coating, casting-coating, reverse roll-coating, transfer roll-coating, kiss/squeeze coating, gravure roll-coating, slot-die coating, blade coating, knife coating, rod/bar coating and wire coating, inkjet printing, and combinations of any of these methods. Various coating methods suitable for use in certain non-limiting embodiments of the present disclosure are also described in "Coating Processes", Kirk-Othmer Encyclopedia of Chemical Technology, Volume 7, pp 1-35, 2004. Non-limiting methods of imbibition are described in U.S. Pat. No. 6,433,043 at column 1, line 31 to column 13, line 54. The disclosure of each of these references is incorporated in their entirety by these references.

Generally, the optical articles are prepared by applying at least one anisotropic material and at least one dichroic material and/or at least one photochromic-dichroic material to form one or more light influencing zones as previously described. Optionally, at least one photochromic material and/or at least one conventional dye can also be applied. Typically, at some of these materials are applied to the optical element with other additives, such as the additives previously described, in one or more coating compositions. For example, a coating compositions comprising at least one anisotropic material can be applied to the optical element, aligned in one or more directions, and then cured to form at least one anisotropic coating layer.

Further, an anisotropic coating composition comprising at least one anisotropic material can also include at least one dichroic material and/or at least one photochromic-dichroic material, and, optionally, at least one photochromic material and/or at least one conventional dye. Thus, the anisotropic material, at least one dichroic material and/or at least one photochromic-dichroic material, and, optionally, at least one photochromic material and/or at least one conventional dye can be applied to the optical element simultaneously, aligned, and then cured. Alternatively, the at least one dichroic material, at least one photochromic-dichroic material, and, optionally, at least one photochromic material and at least one conventional dye can be diffused into an aligned and cured anisotropic coating layer through imbibition. As such, the at least one dichroic material, at least one photochromic-dichroic material, and, optionally, at least one photochromic material and at least one conventional dye can be incorporated into an aligned and cured anisotropic coating layer at a later time.

As used herein, the term "imbibition" refers to the process of diffusing or permeating the dichroic material, photochromic-dichroic material, photochromic material, and/or conventional dye into a host material or coating, solvent assisted transfer of such materials into a porous polymer, vapor phase transfer, heat transfer, and the like. Imbibition of dyes into the anisotropic coating layer can include a step of applying, onto at least a portion of the anisotropic coating layer, a composition comprising one or more imbibition resins and at least one dichroic material, photochromic-dichroic material, photochromic material, and/or conventional dye. The composition is then heated such that the dyes are diffused or imbibed into the anisotropic coating layer. The remaining imbibing resins and other residual materials can be washed from the surface of the anisotropic coating layer. The imbibing of dyes into the anisotropic coating layer can also utilize a dye transfer substrate. As used herein, a "dye transfer substrate" refers to a component that can absorb and release dyes under certain conditions. The dye transfer substrate can absorb and release dichroic materials, photochromic materials, photochromic-dichroic materials, and/or conventional dyes into the anisotropic coating layer. The dye transfer substrate can release the dye materials under heat and/or pressure.

As previously noted, the at least the anisotropic materials are aligned after applying the anisotropic coating composition. The anisotropic materials can be aligned by heating the anisotropic coating composition. Generally, the anisotropic coating composition is heated without curing the composition. For instance, the anisotropic coating composition is typically heated at a temperature from 10° C. to 90° C. and for a time period ranging from 10 minutes to 200 minutes. The anisotropic coating composition can then be cured using a variety of art recognized techniques including, but limiting to, actinic radiation treatment, heat treatment such as by heating the composition at a temperature higher than the aligning temperature, and combinations thereof.

In some examples, the anisotropic materials are aligned by the directional information in an alignment coating layer that is positioned between the optical element and the anisotropic coating layer. Thus, the method of preparing the optical articles of the present invention can include a step of forming an alignment coating layer over at least a portion of a surface of the optical element before applying the anisotropic coating composition. The anisotropic coating composition can then be applied over at least a portion of the alignment coating layer and cured.

The alignment coating layer can be formed by applying an alignment coating composition comprising an alignment material and then at least partially aligning the alignment material in any desired direction(s). As used herein, the phrase "at least partially" when used in reference to the degree of alignment of alignable materials in a coating layer means that from 10% to 100% of the alignable elements of the material are aligned. The alignable elements of the material can also display from 25% to 100% alignment, from 50% to 100% alignment, or 100% alignment. Suitable methods for at least partially aligning the alignment materials include, but are not limited to, exposing at least a portion of the composition to a magnetic field, exposing at least a portion of the composition to a shear force, exposing at least a portion of the composition to an electric field, exposing at least a portion of the composition to plane-polarized ultraviolet radiation, exposing at least a portion of the composition to infrared radiation, drying at least a portion of the composition, etching at least a portion of the composition, rubbing at least a portion of the composition, and combinations thereof. Suitable alignment methods for layers are also described in detail in U.S. Pat. No. 7,097,303, at column 27, line 17 to column 28, line 45, which disclosure is incorporated by reference herein.

In some examples, an alignment coating composition comprising a photo-alignment material, such as any of those previously described, is applied over at least a portion of a surface of an optical element and aligned in any desired direction through exposure to polarizing electromagnetic radiation. The anisotropic coating composition is then applied over at least a portion of the alignment coating layer, and at least a portion of the anisotropic materials are aligned in the direction of the photo-alignment material. The anisotropic coating composition is then cured to form an anisotropic coating layer. If the anisotropic coating composition did not include any dye materials, then at least one dichroic material and/or at least one photochromic-dichroic material, and, optionally, at least one photochromic material and conventional dye are applied and diffused into the already formed anisotropic coating layer.

The methods described herein are also be used to form an optical article with one or multiple light influencing zones. These light influencing zones can be formed by the anisotropic coating layer, the alignment coating layer, or a combination thereof. It is appreciated that the methods of the present invention can be used to form any of the previously described light influencing zones.

To form the light influencing zones with the anisotropic coating layer, various methods such as spraying, spin coating, and any of the other non-limiting techniques previously described can be used to apply one or more coating compositions with anisotropic materials and different types and/or amounts of dye materials (i.e. dichroic material, photochromic-dichroic material, photochromic material, and/or conventional dye). For example, a first coating composition comprising anisotropic materials and at least one dichroic material can be applied over a first region of an alignment coating layer, and a second coating composition comprising anisotropic materials and at least one photochromic material can be applied over a second region of an alignment coating layer. The anisotropic coating compositions can then be aligned and cured to form a single anisotropic coating layer with a first light influencing zone that exhibits a fixed color/tint and fixed polarization, and a second light influencing zone that exhibits a reversible color change and no polarization. Imbibition methods can also be used to form an anisotropic coating layer with different light influencing zones. For instance, different amounts and/or types of dyes materials can be diffused into different regions of an already cured anisotropic coating layer such that multiple light influencing zones are formed.

While multiple anisotropic coating compositions can be used to provide different light influencing zones, the multiple anisotropic coating compositions are applied and cured to form a single and continuous anisotropic coating layer over the optical element and/or over the alignment coating layer. The single and continuous anisotropic coating layer provides a coating with multiple light influencing properties that have a continuous transition over the optical article.

Further, the alignment coating layer can also be used to form light influencing zones. In some examples, light influencing zones are formed by selectively exposing different regions of a photo-alignment coating composition to polarized electromagnetic radiation in different directions. For instance, an alignment coating composition comprising photo-alignment materials can be applied to an optical element, and at least a first portion of the alignment coating composition can be exposed to polarized UV radiation in a first direction while at least a second portion of the alignment coating composition can be exposed to polarized UV radiation in a second direction that is different from the first direction. An anisotropic coating layer comprising dichroic materials and/or photochromic-dichroic materials, and, optionally, photochromic materials and conventional dyes is then formed over the alignment coating layer. The dichroic materials and/or photochromic-dichroic materials applied over the first portion of the alignment coating layer will align in the first direction to form a first light influencing zone, and the dichroic materials and/or photochromic-dichroic materials applied over the second portion of the alignment coating layer will align in the second direction to form a second light influencing zone. Those skilled in the art will appreciate that this process can be used to form multiple light influencing zones.

With reference to photo-alignment coating layers, a masking method can be used to selectively align different regions of the photo-alignment coating composition. As used herein, with reference to aligning regions of a photo-alignment coating layer, "masking" refers to the use of a component that blocks polarized UV radiation. The component used to block different regions of the photo-alignment coating composition includes, but is not limited to, positive and negative UV blocking sheets. Further, a single masking step or multiple masking steps can be used to selectively align different regions of the photo-alignment coating composition. With reference to a single masking step, a masking sheet that blocks polarized UV radiation can be applied over a first region of the photo-alignment coating composition. After applying the masking sheet, the photo-alignment coating composition is exposed to polarized UV radiation in a first direction. The masking sheet is then removed and the entire photo-alignment coating composition is exposed to polarized UV radiation in a second direction that is different than the first direction. The resulting photo-alignment coating layer will have at least a first region with photo-alignment materials aligned in the first direction and at least a second region with photo-alignment materials aligned in the second direction.

Alternatively, with reference to multiple masking steps, a first masking sheet that blocks polarized UV radiation can be applied over a first region of the photo-alignment coating composition. After applying the first masking sheet, the photo-alignment coating composition is exposed to polarized UV radiation in a first direction. The first masking sheet is then removed and a second masking sheet is applied over a second region of the photo-alignment coating composition. The photo-alignment coating composition is then exposed to polarized UV radiation in a second direction that is different the first direction. The resulting photo-alignment coating layer will have at least a first region with photo-alignment materials aligned in the first direction and at least a second region with photo-alignment materials aligned in the second direction.

The masking method can also be used to form an alignment coating layer with gradient polarization. For example, gradient polarization can be formed by using a masking sheet that allows gradient amounts of polarized UV radiation into the alignment coating composition such that increasing amounts of photo-alignment materials align from one end of the coating layer to the other. This technique can also be used to provide gradient polarization along at least two different polarizing directions by subsequently using a second gradient masking sheet that blocks polarized radiation in a different polarizing direction. It is appreciated that the dichroic materials and/or photochromic-dichroic materials will align to from the gradient polarization based on the gradient amounts of aligned anisotropic materials.

Figure 6:
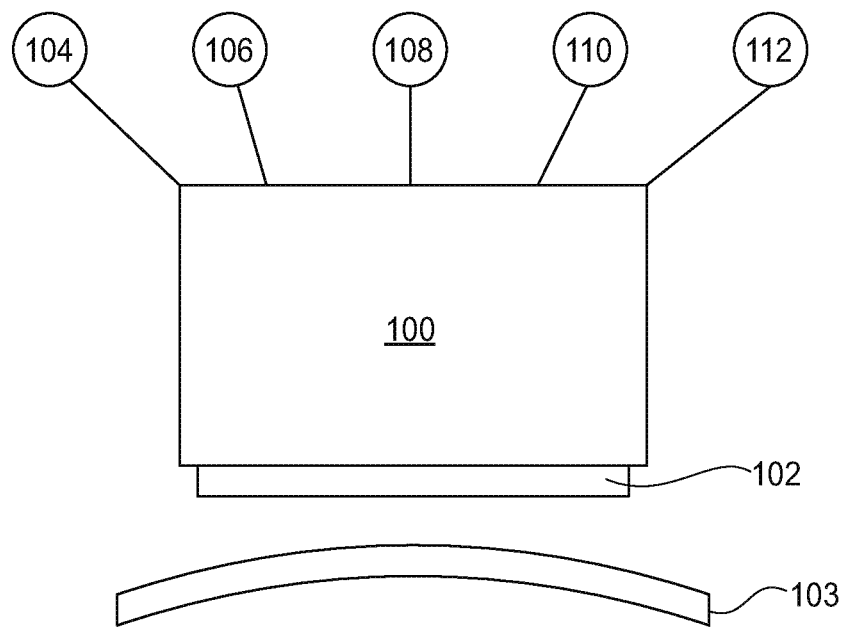
FIG. 6 illustrates an ophthalmic lens and an inkjet printer fluidly connected to sources containing anisotropic materials, dichroic materials, photochromic materials, photochromic-dichroic materials, and/or conventional dyes.

As indicated, an inkjet printer can also be used to form the optical articles of the present invention. As shown in FIG. 6, the inkjet printer 100 can include a printing head 102 that is fluidly connected to a source(s) containing anisotropic materials 104, dichroic materials 106, photochromic materials 108, photochromic-dichroic materials 110, and/or conventional dyes 112 that do not polarize or reversibly change color. During operation, the inkjet printing head 100 can scan the inkjet printing header 102 over the optical element 103 and apply anisotropic materials 104, dichroic materials 106, photochromic materials 108, photochromic-dichroic materials 110, and/or conventional dyes 112 onto an optical element 103. The inkjet printer can apply the anisotropic materials 104, dichroic materials 106, photochromic materials 108, photochromic-dichroic materials 110, and/or conventional dyes 112 simultaneously. Alternatively, the inkjet printer 100 can apply the dichroic materials 106, photochromic materials 108, photochromic-dichroic materials 110, and/or conventional dyes 112 after applying the anisotropic materials 102. As will be recognized by one skilled in the art, the anisotropic materials 104, dichroic materials 106, photochromic materials 108, photochromic-dichroic materials 110, and/or conventional dyes 112 are typically applied with additional additives in a coating composition as previously described.

The inkjet printing process described herein allows a user to apply different types and/or amounts of dye materials such that different light influencing zones can be formed over different regions of the optical article. As such, the inkjet printer 100 can be used to apply different amounts and/or types of dichroic materials 106, photochromic materials 108, photochromic-dichroic materials 110, and/or conventional dyes 112 to an optical element 103 to form an optical article with one or more light influencing zones including, but not limited to, any of the light influencing zones previously described.

The inkjet printer can also be used to form an anisotropic coating layer that does not include any dye materials so that the dye materials can be incorporated at a later time. For example, the inkjet printer 100 can be used to apply an anisotropic coating layer with anisotropic materials 104 onto an optical element 103. Then, at a later time, dichroic materials, photochromic materials, photochromic-dichroic materials, and/or conventional dyes can be incorporated through an imbibition method.

In some examples, an optical element 103 is coated with an alignment coating layer, such as through a spin coating method for example. The entire alignment coating layer can be aligned in one direction or it can have different regions aligned in different directions as previously described. The inkjet printer 100 can then apply the anisotropic coating layer comprising anisotropic materials 104 and various dyes to form an optical article with one or more light influencing zones. It has been found that the inkjet printer 100 can accurately and precisely apply various types of dye materials to provide an optical article with multiple light influencing zones at any desired region of the article.

The optical article with multiple light influencing zones can also be formed by applying two or more anisotropic coating compositions with at least one anisotropic material and one or more dichroic materials and/or photochromic-dichroic materials followed by a spinning process. For example, the two or more anisotropic coating compositions can be applied by any of the previously described coating processes, such as spray coating for example, and then spun for a particular amount of time and at a certain speed (i.e., revolutions per minute (rpms)) such that the coating compositions form one continuous compositional layer over an optical element. Further, a portion of any of the anisotropic coating compositions may or may not overlap with another anisotropic coating composition when applied to the optical element. In some examples, overlapping portions of separate anisotropic coating compositions can be spun to provide a gradient such as any of the gradients previously described. The spinning process can also be controlled to prevent any substantial overlap of different coating compositions. After spinning, the continuous compositional layer can be cured to form the anisotropic coating layer with multiple light influencing zones.

Moreover, in some examples, an optical article with one or more light influencing zones is prepared by imbibition of dyes such as through a dip dying process or with the use of a dye transfer substrate. The different steps of this process can be performed at different points in time by different individuals, entities, and the like. It will be appreciated that optical articles, such as those previously described, can be produced with this process. For example, referring to FIG. 7, an optical article 200 with one or more light influencing zones, as described above, can be produced through an imbibition process, yielding the optical article 200 with one more light influencing zones having a continuous gradient tint and gradient polarization. However, the gradient tint and gradient polarization of the optical article 200 can also have a non-continuous gradient (i.e. a step gradient). As previously indicated, the optical article 200 can include an optical element including, but not limited to an optical lens, an ophthalmic lens, an optical filter, a window, a visor, a mirror, a display, and the like. In addition, the optical element can comprise at least one major surface, and at least one alignment zone can be located over at least a portion of the one major surface. The major surface can be a curved surface or a non-curved surface.

Figure 7:
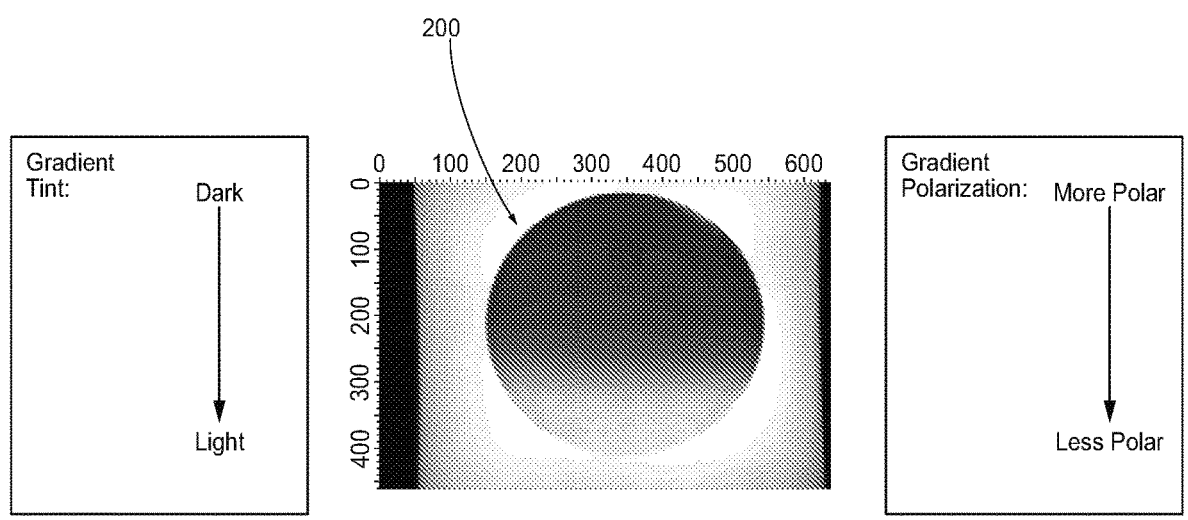
FIG. 7 illustrates an optical article having a gradient tint and a gradient polarization.

As shown in FIG. 7, the gradient tint and gradient polarization of the optical article 200 can extend over an entire surface of the optical article 200. For instance, in FIG. 7, the tint gradient extends from the top of the optical article 200, where the tint is darkest, to the bottom of the optical article 200, where the tint is lightest, or where no tint is present. FIG. 7 also shows a gradient polarization over the entire surface of the optical article 200 with the polarization gradient extending from the top of the optical article 200, where there is the most polarization, to the bottom of the optical article, where there is the least polarization, or where there is no polarization. However, in other examples, the tint gradient and the polarization gradient can extend over only part of the surface of the optical article 200.

FIG. 7 also shows an end of the optical article 200 having the darkest tint corresponding to an end of the optical article 200 having the most polarization, and the end of the optical article 200 having the lightest or no tint corresponding to the end of the optical article having the least polarization or no polarization. Therefore, the gradients of tint and polarization in FIG. 7 decrease in tint/polarization in the same direction. However, in other examples, the end of the optical article 200 having the most polarization may be different than the end of the optical article 200 having the darkest tint, and the direction of the tint and polarization gradients along the optical article 200 can be different as well.

FIGS. 8A-9E are block diagrams showing exemplary methods for making an optical article having a gradient tint and a gradient polarization.

Figure 8A:
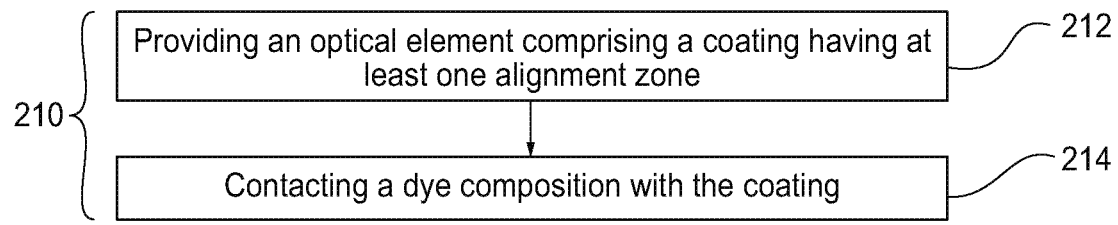
FIGS. 8A-8E are block diagrams illustrating exemplary methods for making an optical article having a gradient tint and a gradient polarization.
Figure 8B:
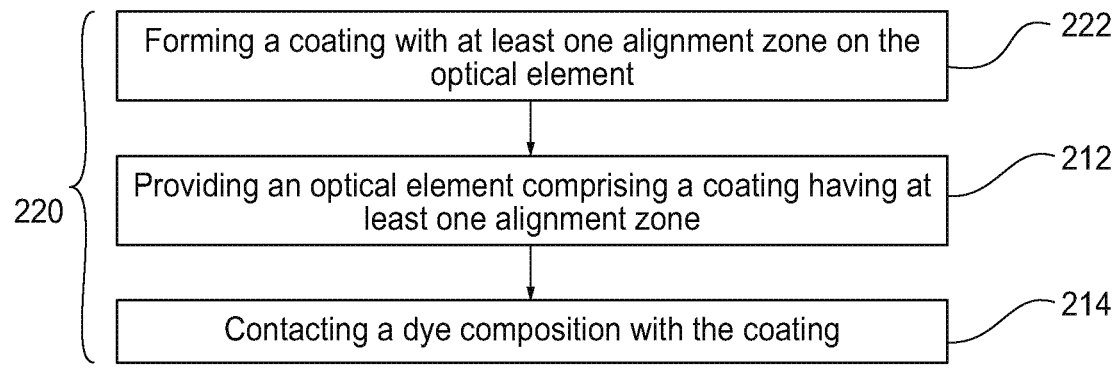
Figure 8C:
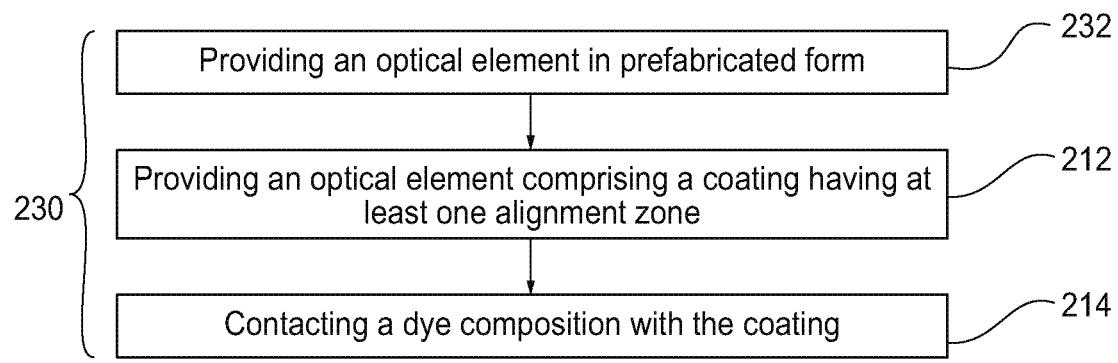

Referring to FIGS. 8A-8C, a producer of optical articles can make optical articles having a gradient tint and gradient polarization. A producer can be any maker of optical articles, and in some examples include manufacturers of lenses, suppliers of lenses, and ophthalmic laboratories. As shown in FIG. 8A, in one exemplary process 210, the producer provides an optical element comprising at least an anisotropic coating layer having at least one alignment zone 212 orientated in a particular direction and contacts a dye composition with the anisotropic coating layer 214 of the optical element to diffuse at least a portion of the dye composition into the anisotropic coating layer at a predetermined concentration gradient along at least a portion of the anisotropic coating layer to provide the gradient tint and the gradient polarization. In another exemplary process 220, before the step of providing an optical element comprising at least an anisotropic coating layer having at least one alignment zone 212, the anisotropic coating layer having at least one alignment zone is formed on the optical element 222. In another process 230, before the step of providing an optical element comprising at least an anisotropic coating layer having at least one alignment zone 212, an optical element is provided in prefabricated form 232.

Figure 8D:
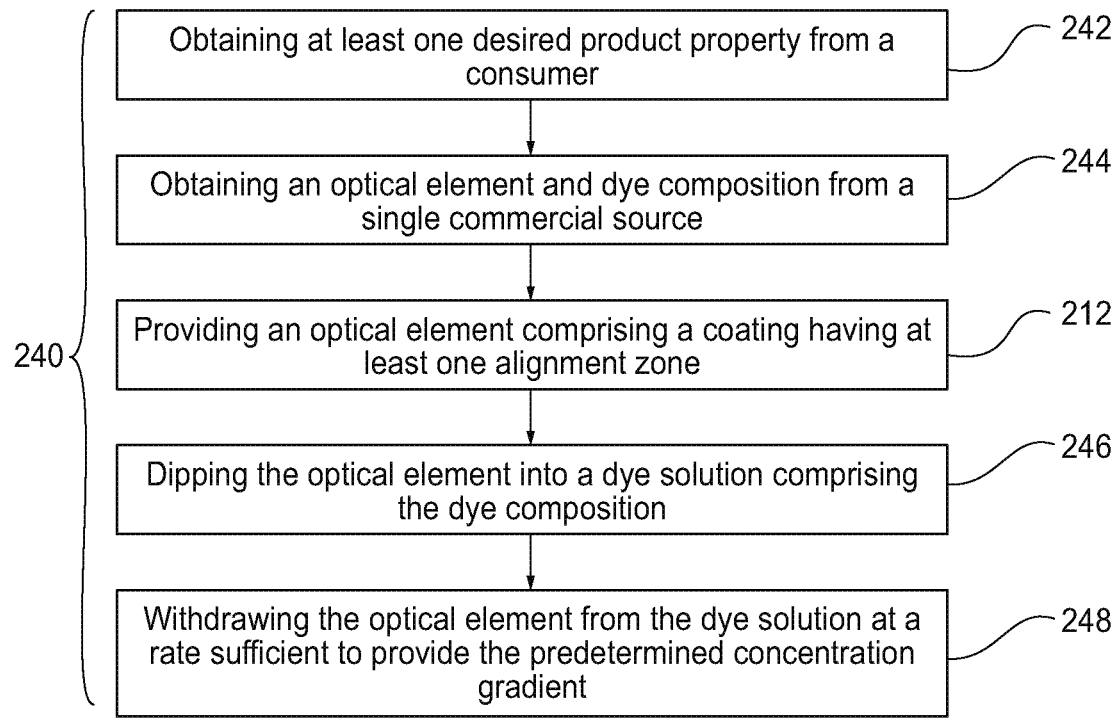
Figure 8E:
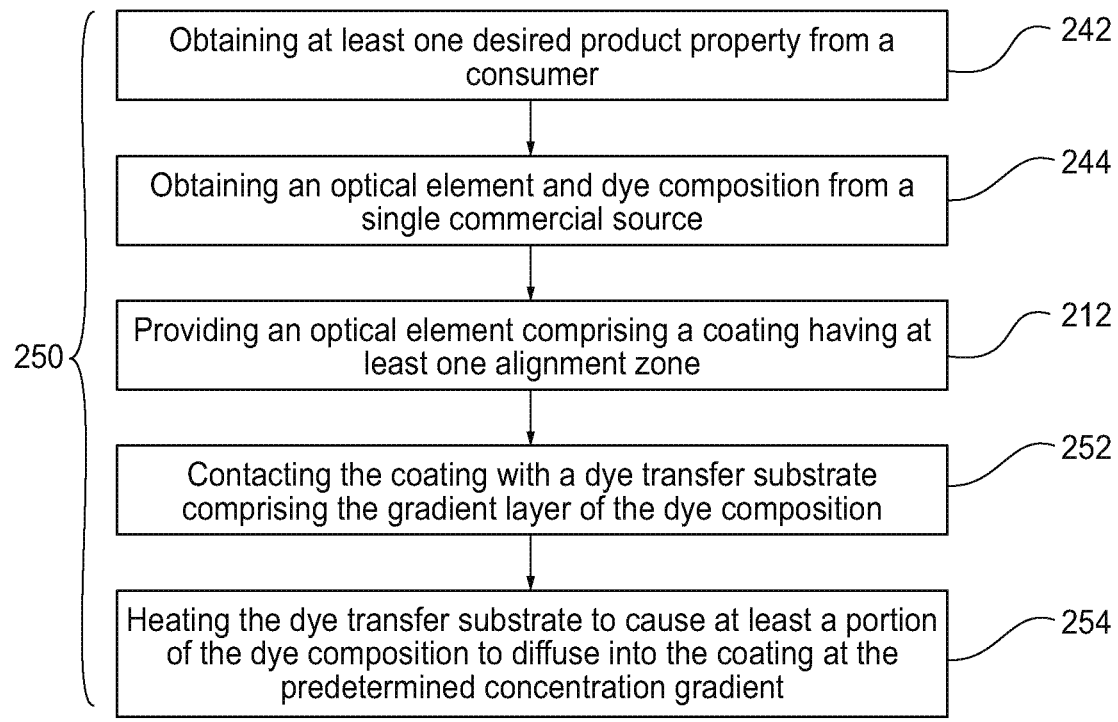

Referring to FIGS. 8D and 8E, a producer can make optical articles having a gradient tint and gradient polarization. In the exemplary process, 240 shown in FIG. 8D, the producer obtains at least one desired product property from a consumer 242. The producer also obtains an optical element and dye composition from a single commercial source 244. An optical element comprising at least an anisotropic coating layer having at least one alignment zone is provided 212. A dye composition is then applied to the anisotropic coating layer by dipping the optical article into a dye solution comprising the dye composition 246. The optical article is then withdrawn from the dye solution at a rate sufficient to provide a predetermined concentration gradient 248. In another exemplary process 250, the producer obtains at least one desired product property from a consumer 242. The producer also obtains an optical element and dye composition from a single commercial source 244. The optical element comprises at least an anisotropic coating layer having at least one alignment zone 212. The anisotropic coating layer of the optical article is then contacted with a dye transfer substrate comprising a gradient layer of the dye composition 252. Heat is then applied to the dye transfer substrate to cause at least a portion of the dye composition to diffuse into the anisotropic coating layer at the predetermined concentration gradient 254.

Figure 9A:
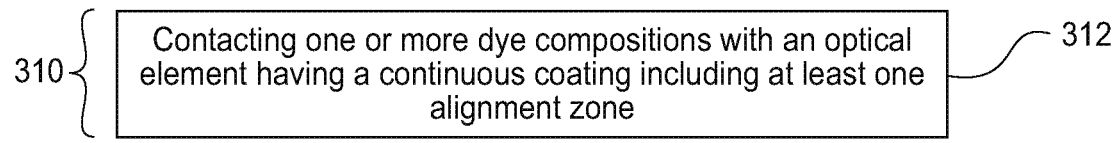
FIGS. 9A-9E are block diagrams illustrating exemplary methods for making an optical article having a gradient tint and a gradient polarization.
Figure 9B:
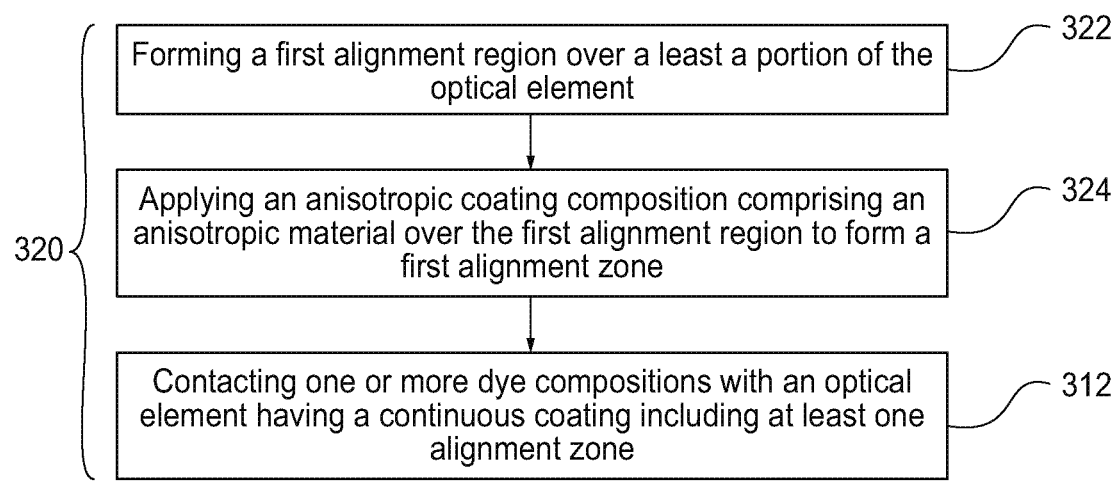
Figure 9C:
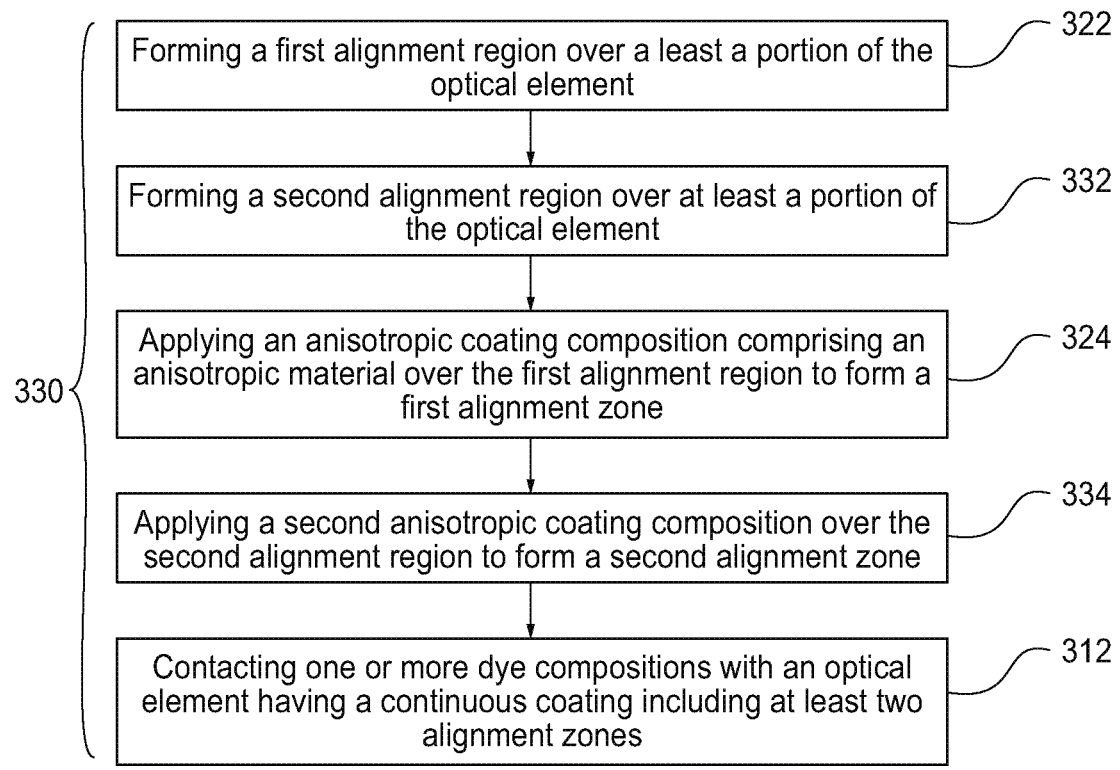

Referring to FIGS. 9A-9C, an optical article having a gradient tint and gradient polarization can be made. In one process 310, the optical article can be made by contacting one or more dye compositions with an optical element having a continuous anisotropic coating layer including at least one alignment zone 312. In another exemplary process 320, an alignment coating composition is applied over the optical element and a first alignment region is formed over at least a portion of the optical element 322. An anisotropic coating composition comprising an anisotropic material is then applied over the first alignment region, aligned to form a first alignment zone, and then cured to form a continuous anisotropic coating layer 324. The optical element having a continuous anisotropic coating layer including at least one alignment zone can then be contacted by one or more dye compositions 312. In another process 330, an alignment coating composition is applied over the optical element and a first alignment region is formed over at least a portion of the optical element 322. A second alignment region of the alignment coating composition is then formed over at least a second portion of the optical element 332. An anisotropic coating composition comprising an anisotropic material is applied over the first alignment region, aligned to form a first alignment zone, and then cured to form a continuous anisotropic coating layer 324. A second anisotropic coating composition is next applied over the second alignment region to form the second alignment zone 334. The optical element having a continuous coating including at least two alignment zone can then be contacted by one or more dye compositions 312.

Figure 9D:
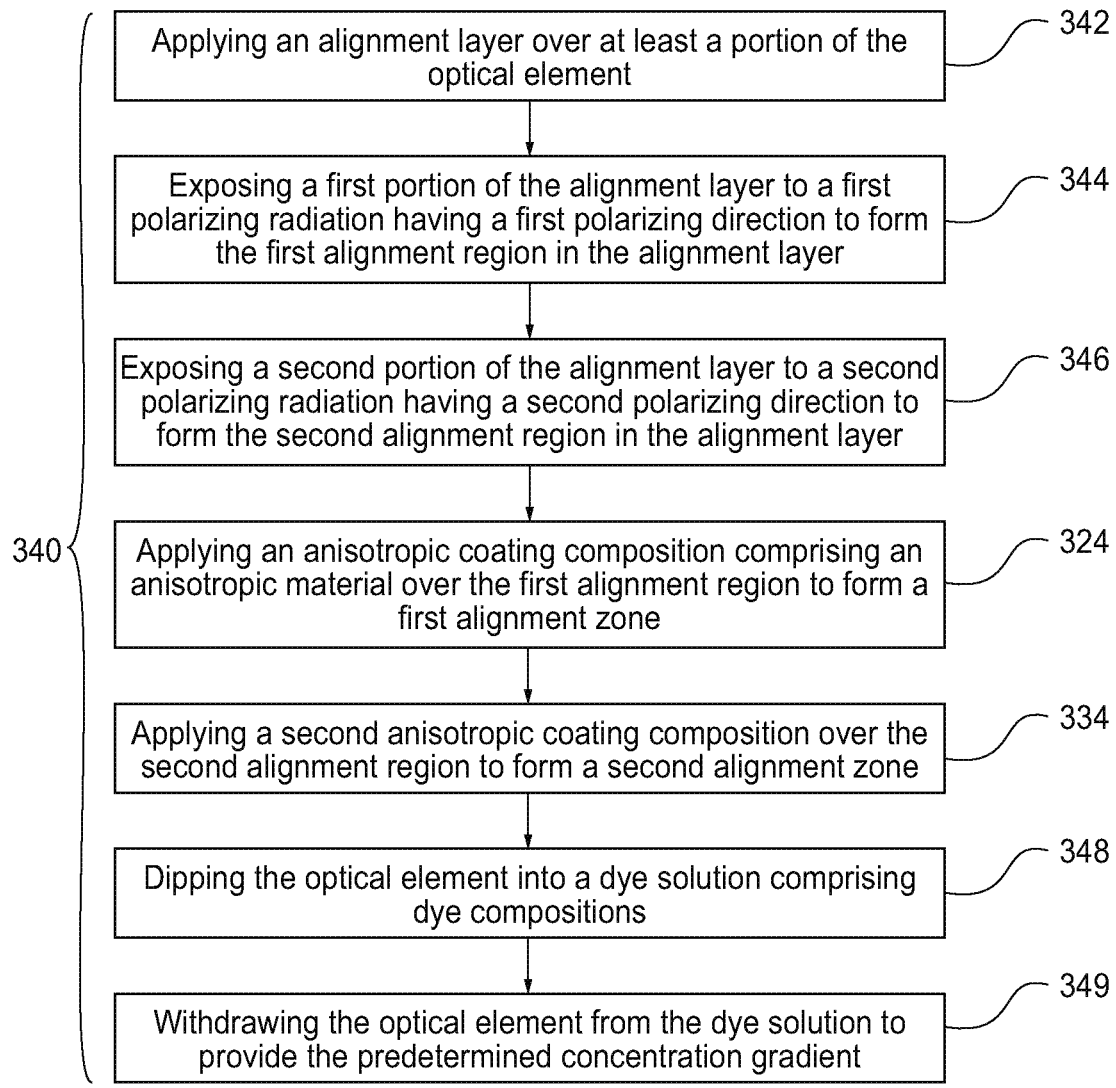
Figure 9E:
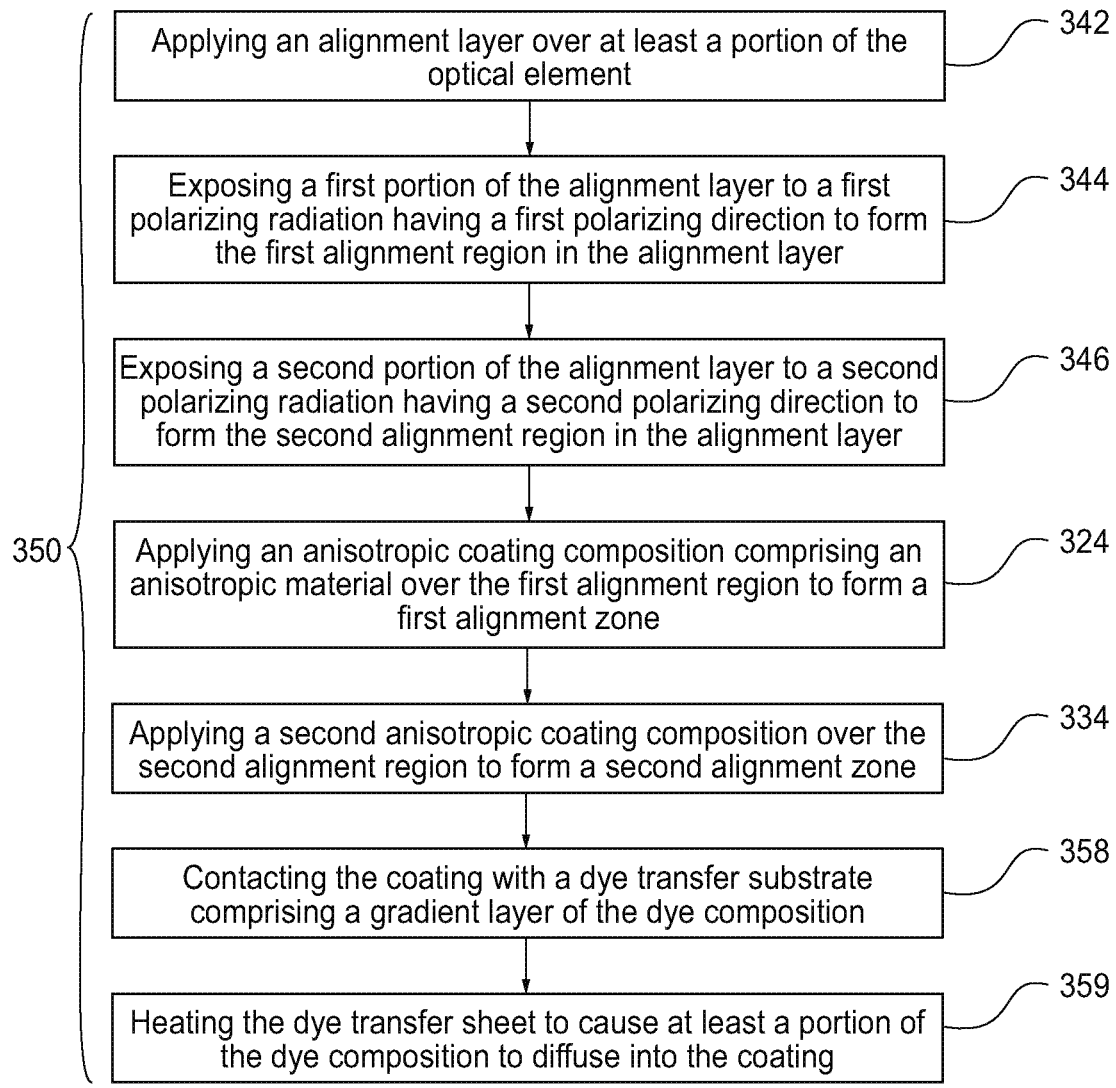

Referring to FIGS. 9D-9E, an optical article having a gradient tint and gradient polarization can be made. According to one exemplary process 340, an alignment coating composition can be applied over at least a portion of an optical element 342. A first portion of the alignment coating composition can be exposed to a first polarized radiation having a first polarizing direction to form the first alignment region in the alignment coating layer 344. A second portion of the alignment coating composition can be exposed to a second polarized radiation having a second polarizing direction to form the second alignment region in the alignment layer 346. An anisotropic coating composition comprising an anisotropic material can be applied over the first alignment region, aligned, and cured to form a first alignment zone 324, and a second anisotropic coating composition can be applied over the second alignment region, aligned, and cured to form a second alignment zone 334. The dye composition can contact the optical element by dipping the optical element into a dye solution comprising dye compositions 348. The optical element can then be withdrawn from the dye solution to provide the predetermined concentration gradient. In a second exemplary process 350, the dye composition contacts the optical element by contacting the coating with a dye transfer substrate comprising a gradient layer of the dye composition 358. The dye transfer sheet can then be heated to cause at least a portion of the dye composition to diffuse into the anisotropic coating layer. 359.

The optical element including an anisotropic coating layer having at least one alignment zone can be provided by purchasing the optical element from a third party manufacturer of optical elements or any other manufacturer. The optical element can be provided to the producer by a third party manufacturer in prefabricated form. Prefabricated form means the optical element is already prepared with the anisotropic coating layer having at least one alignment zone already formed. For instance, a third party manufacturer can provide the producer with a prefabricated lens blank comprising a anisotropic coating layer having at least one alignment zone. However, in other processes, the producer does not obtain the optical element comprising an anisotropic coating layer having at least one alignment zone from a third party manufacturer, and the optical element comprising an anisotropic coating layer having at least one alignment zone can instead be made by the producer. In these scenarios, the producer can form an anisotropic coating layer with at least one alignment zone on the optical element.

The optical element comprising an anisotropic coating layer having at least one alignment zone can be made, either by the producer or a third party manufacturer, using any suitable process, such as the above-described processes.

After the producer obtains or makes the optical element comprising an anisotropic coating layer having at least one alignment zone, the anisotropic coating layer of the optical element is contacted with a dye composition. The producer can obtain at least one dye composition from a third party manufacturer of dye compositions or any other manufacturer. The dye composition can be a commercially prepackaged composition. The dye composition can comprise a dichroic dye and/or a photochromic-dichroic dye and can optionally comprise a photochromic dye and/or a conventional dye. Additional dye composition(s) can be obtained. Each additional dye composition can comprise a dichroic dye and/or a photochromic-dichroic dye and/or a photochromic dye and/or a conventional dye. The dye composition and/or the additional dye compositions can be obtained from the same third party manufacturer as the third party manufacturer of the optical element comprising the anisotropic coating layer having at least one alignment zone (i.e. from a single commercial source). In another exemplary process, the dye composition and/or the additional dye compositions can be obtained from a different third party manufacturer as the third party manufacturer of the optical element comprising the anisotropic coating layer having at least one alignment zone. In another exemplary process, the dye composition and/or the additional dye compositions can be made by the producer.

The producer can contact the dye composition with the anisotropic coating layer of the optical element to produce an optical article with gradient tint and gradient polarization by any appropriate method, including, but not limited to, spin coating, flow coating, spray coating, dip dye method, use of a dye transfer substrate, curtain coating, and any combination thereof.

Referring to FIGS. 10A-12, a dye solution can contact the anisotropic coating layer of the optical element by a dip dye method. According to the dip dye method of the present invention, an optical element 400 comprising an anisotropic coating layer 402 having at least one alignment zone, is dipped into a bath 254 and contacted with a dye solution 406. The bath 404 can be any container that can hold a dye solution 406 and has sufficient size to allow the optical element 400 comprising the anisotropic coating layer 402 to be dipped therein. The dye solution can be held at any temperature, such as between 0° C. up to about 200° C. The dye solution 406 can comprise dye composition(s) 432 (shown in FIG. 14) including a dichroic dye and/or a photochromic-dichroic dye (and optionally a photochromic dye or a conventional dye). There may be multiple baths 404 holding the dye solution 406 and any additional dye solution. An additional dye solution can comprise dye composition(s) 432 including a dichroic dye and/or a photochromic-dichroic dye and/or a photochromic dye and/or a conventional dye. In scenarios where there are multiple baths 404 comprising dye solutions 406, the optical element 400 comprising the anisotropic coating layer 402 having at least one alignment zone can be sequentially dipped into each of the prepared baths 404 to obtain the desired effects.

Figure 10A:
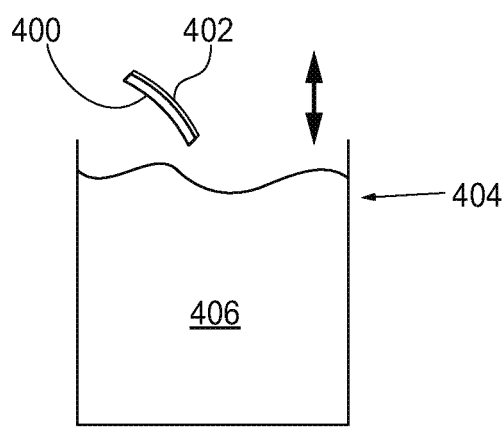
FIGS. 10A-10D illustrate an optical article having an anisotropic coating layer suspended over a bath comprising dye solution to contact the anisotropic coating layer with the dye solution by a dip dye method.
Figure 10B:
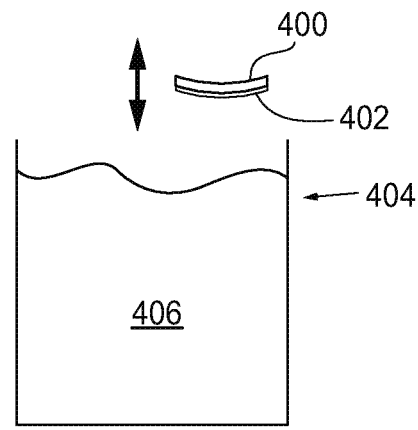
Figure 10C:
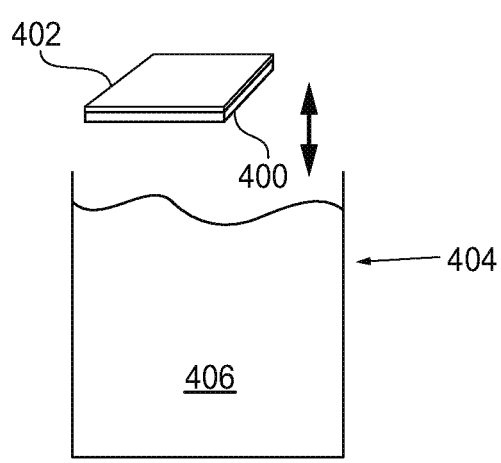
Figure 10D:
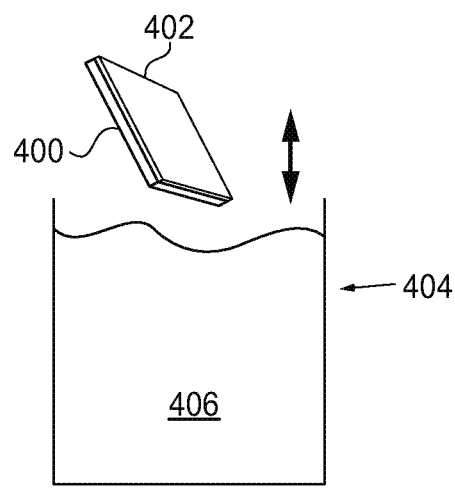

According to the dip dye method, at least a portion of the optical element 400 comprising the anisotropic coating layer 402 is submerged (dipped) into the dye solution 406 of the dye composition(s) 432 of the bath 404. The optical element 400 can be of any type, as previously mentioned, such as an optical lens, an ophthalmic lens, an optical filter, a window, a visor, a mirror, a display, and the like. FIGS. 10A and 10C show several different types of optical elements 400 (i.e. a curved optical element 400 and a non-curved optical element 400). The optical element 400 can be dipped into the bath 404 in any orientation (as shown in FIGS. 10A-10D). For instance, the optical element 400 can be dipped into the bath 404 while at an angle (see FIGS. 10A and 10D). In other examples, the optical element 400 can be dipped substantially horizontally (see FIGS. 10B and 10C) or substantially vertically (not shown) or any orientation between substantially horizontally and substantially vertically. The orientation at which the optical element 400 is dipped into the bath 404 can affect the tint gradient and the polarization gradient on the resulting optical article.

Figures 11A, 11B:
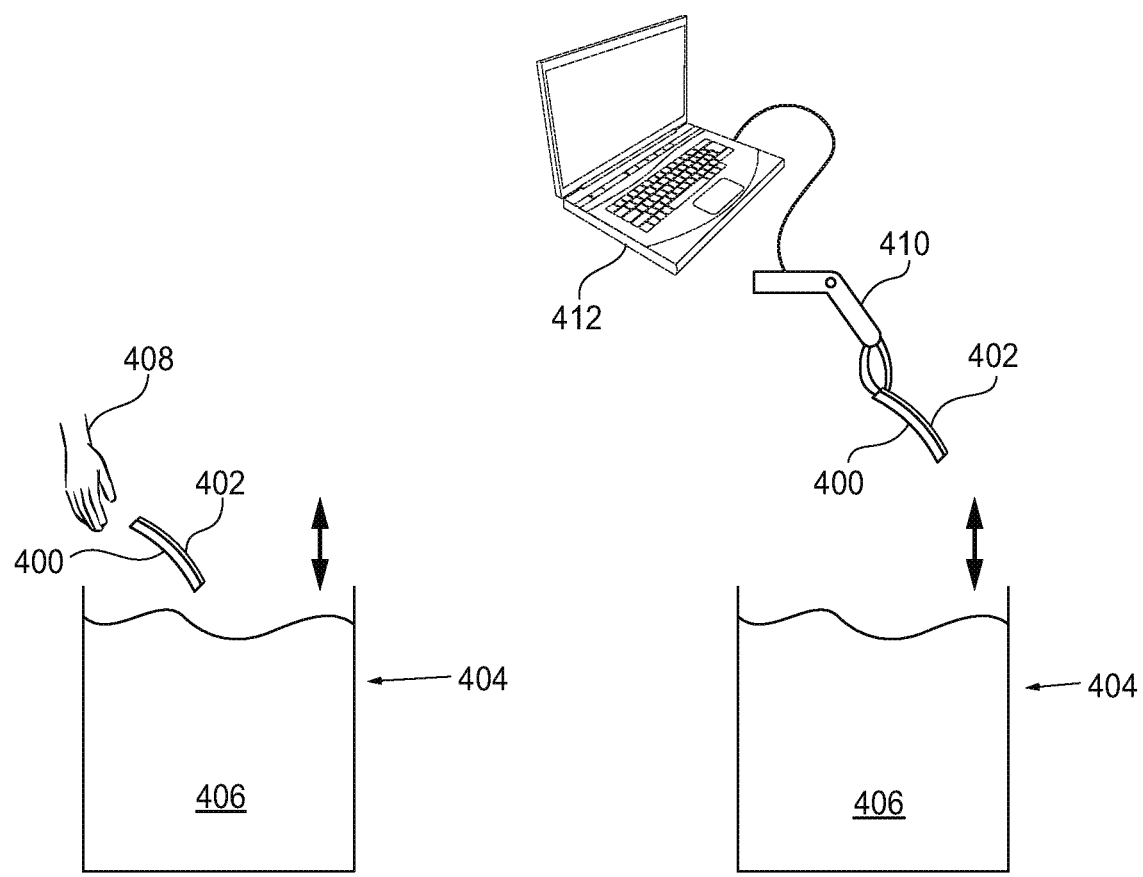
FIGS. 11A-11B illustrate an optical article having an anisotropic coating layer suspended over a bath comprising dye solution to contact the anisotropic coating layer with the dye solution by a dip dye method.

Referring specifically to FIGS. 11A and 11B, the optical element 400 having an anisotropic coating layer 402 can be dipped into the bath 404 comprising a dye solution 406 by any means of submerging at least a portion of the optical element 400 in the dye solution 406. For instance, as shown in FIG. 11A, the optical element 400 can be manually dipped (e.g., hand dipped) into the dye solution 406 by a user 408. In contrast, as shown in FIG. 11B, the optical element 400 can be automatically dipped into the dye solution 406 by, for instance, a mechanical member 410 controlled by a controller 412.

Figure 12:
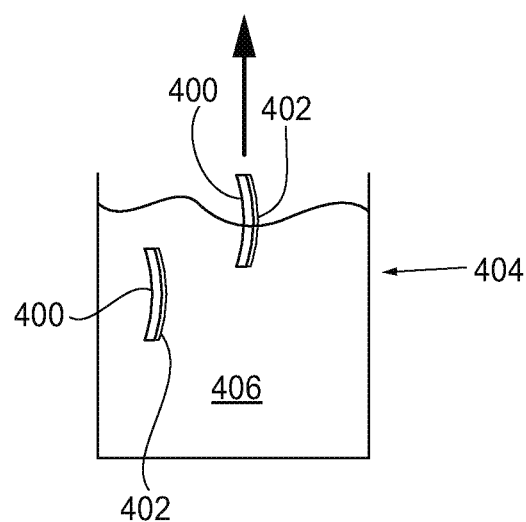
FIG. 12 illustrates an optical article having an anisotropic coating layer submerged in a bath comprising dye solution to contact the anisotropic coating layer with the dye solution by a dip dye method.

Referring to FIG. 12, according to the dip dye method, at least a portion of the optical element 400 having the anisotropic coating layer 402 is submerged in the dye solution 406. The portion of the optical element 400 submerged in the dye solution 406 depends on the desired gradient tint and gradient polarization the producer wishes to impart on the anisotropic coating layer 402 of the optical element 400. For instance, the optical element 400 may be either fully submerged in the dye solution 406, or only partially submerged in the dye solution 406 (see FIG. 12).

According to the dip dye method, at least a portion of optical element 400 having the anisotropic coating layer 402 is first submerged in the dye composition contained in the bath 404. The submerged optical element 400 is then removed from the dye solution 406. The submerged optical element 400 can be removed from the dye solution 406 at a rate sufficient to provide a predetermined concentration gradient. The process of submerging in and removing from the dye solution 406 may be repeated multiple times to achieve the desired tint and polarization Optionally, the optical element 400 can be dipped into additional baths 404 and withdrawn from additional dye solutions at a rate sufficient to provide the predetermined concentration gradient. When the optical element 400 is dipped into the dye solution(s) 406, the dye solution 406 diffuses into a three-dimensional polymeric matrix of the anisotropic coating layer 402. The longer, or the more times, the optical element 400 comprising the anisotropic coating layer 402 is submerged in the dye solution 406, the more the dyes will diffuse into the polymeric matrix (i.e., the greater the tint and polarization). Because the three-dimensional polymeric matrix of the first alignment zone of the anisotropic coating layer 402 is aligned in the first direction, the dyes also align in the first direction when they diffuse into the polymeric matrix of the first alignment zone, providing polarization in the first direction.

According to the dip dye method, the optical element 400 comprising the anisotropic coating layer 402 can be extracted from the dye solution 406 at a predetermined rate to provide a predetermined concentration gradient of the dyes diffused into the polymeric matrix of the anisotropic coating layer 402 along a length of the optical element. This can result in a predetermined tint gradient and polarization gradient along the length of the optical element. In another example, the optical element 400 comprising the anisotropic coating layer 402 can be extracted at different rates as it is being removed from the dye solution 406. For instance, the optical element 400 comprising the anisotropic coating layer 402 can be fully submerged in the dye solution 406. A first portion of the optical element 400 can be removed from the dye solution 406 at one rate, and then a second portion of the optical element 400 can be removed at another rate (i.e. the speed at which the optical element 400 is removed changes before the entire optical element 400 is removed). There may also be pauses during the removal of the optical element 400 from the dye solution 406 so as to allow the remaining submerged portion to absorb more dyes before the remaining portion of the optical element 400 is removed from the dye solution 406. An optical element 400 removed at a constant rate can have a continuous tint gradient and polarization gradient, while varying the rate at which the optical element 400 is removed from the dye composition can create a non-continuous a tint gradient and polarization gradient (i.e. a step gradient).

Figure 13:
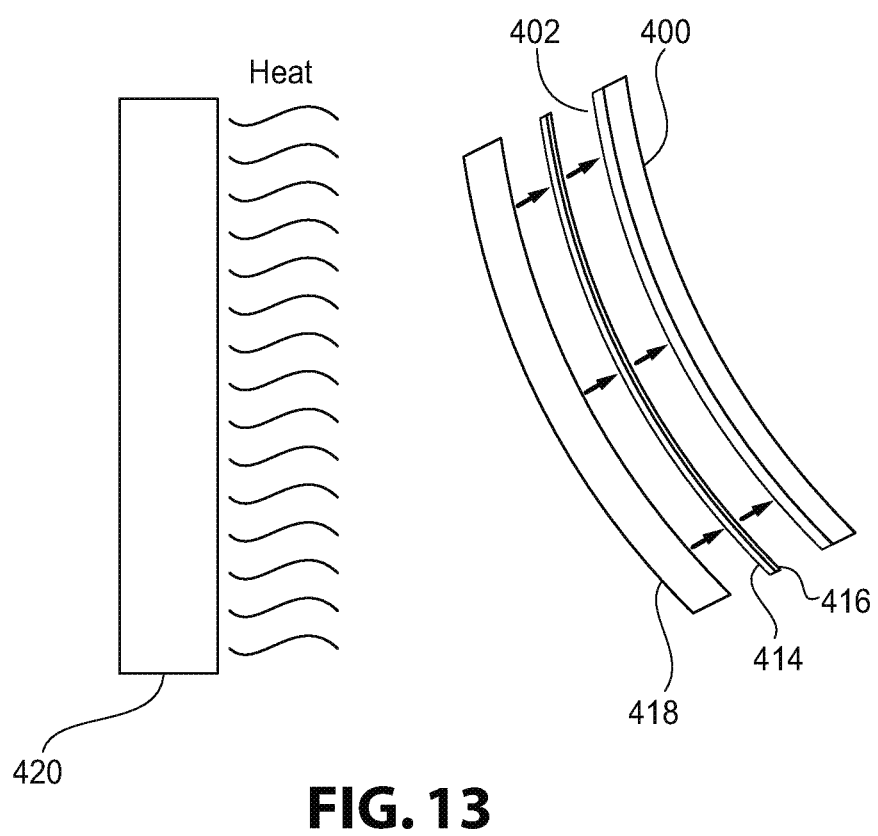
FIG. 13 illustrates an optical article having an anisotropic coating layer being contacted by a dye transfer substrate comprising a gradient layer of dye composition.

Referring to FIG. 13, a dye composition can contact the anisotropic coating layer 402 of the optical element 400 by contacting the anisotropic coating layer 402 with a dye transfer substrate 414 comprising a gradient layer of dye composition 416. The dye transfer substrate can be a sheet, such as a flexible sheet configured to hold the gradient layer of dye composition 416, yet allow the gradient layer of dye composition 416 to transfer to an adhered surface upon heating of the dye transfer substrate 416. A gradient layer of dye composition 416 can contact the anisotropic coating layer 402 of the optical element 400 by applying a side of the dye transfer substrate 414 comprising the gradient layer of dye composition 416 against the anisotropic coating layer 402. Optionally, a securing means 418 can be secured to a side of the dye transfer substrate 414 opposite the side of the dye transfer substrate having a gradient layer of dye composition 416 so that the gradient layer of dye composition 416 cannot slide while in contact with the anisotropic coating layer 402. The securing means 418 can be any material sufficient to secure the gradient layer of dye composition 416 to the anisotropic coating layer 402 so that neither can slide. For instance, the securing means 418 can be a heavy material such as a metal plate. When the dye transfer substrate 414 comprising the gradient layer of dye composition 416 is applied against the coating, the dye transfer substrate 414 is heated by a heater 420. The heater 420 can be any means to heat the dye transfer substrate 414 to a sufficient temperature that allows the dyes to diffuse into the anisotropic coating layer 402 in accordance with the gradient layer of dye composition 416. In another example, the gradient layer of dye composition 416 can be diffused into the anisotropic coating layer 402 by applying pressure the contacted dye transfer substrate 414 and anisotropic coating layer 402. Once a desired amount of the dyes have transferred from the dye transfer substrate 414 to the anisotropic coating layer 402, the dye transfer substrate 414 can be removed.

A consumer can contact the producer to order an optical article having gradient tint and gradient polarization. The consumer may be an individual consumer or a commercial consumer. In one example, the consumer desires an optical article, such as optical lenses, having a gradient tint and a gradient polarization and contacts the producer to have the optical lenses made. The optical lenses can be installed into eyeglass frames to form eyeglasses. In some examples, the consumer can be the wearer of the optical article, such as a wearer of eyeglasses.

The producer can obtain from the consumer desired product property information. The desired product property information can include desired fixed tint gradient, desired activated tint gradient, desired fixed polarization gradient, and desired activated polarization gradient. Fixed tint gradient and fixed polarization gradient refer to the tint and polarization of the optical article that is not exposed to actinic radiation, such as UV radiation. Activated tint gradient and activated polarization gradient refer to the tint and polarization of the optical article upon exposure to actinic radiation. Certain desired product property information can depend on the type of optical article desired by the consumer. For instance, a consumer desiring optical lenses having a gradient tint and gradient polarization may provide further desired product property information, such as prescription strength, choice of eyeglass frames, tint color, additional colorant, amount of optical lens to be covered by the gradient tint, and amount of the optical lens covered by the gradient polarization.

The above-described process can be carried out in light of the desired property information collected from the consumer. The producer can provide the optical element comprising an anisotropic coating layer having at least one alignment zone and contact the coating with a dye composition, in order to make an optical article that matches the customer's specifications. To meet the customer's desired product needs, additional steps may be taken by the producer, or its third party manufacturers. For instance, for a customer ordering lenses for eyeglasses, the lens may need to be cut and ground to the correct size and specifications. In another example, this may require further preparation of the optical article before it is provided to the consumer. For instance, a hard coating may be applied over the optical article to protect the optical article, such as from scratches. In another example, the consumer may desire two optical articles, such as optical lenses, which may be installed into the consumer's chosen eyeglass frames before the optical articles are provided to the consumer.

Figure 14:
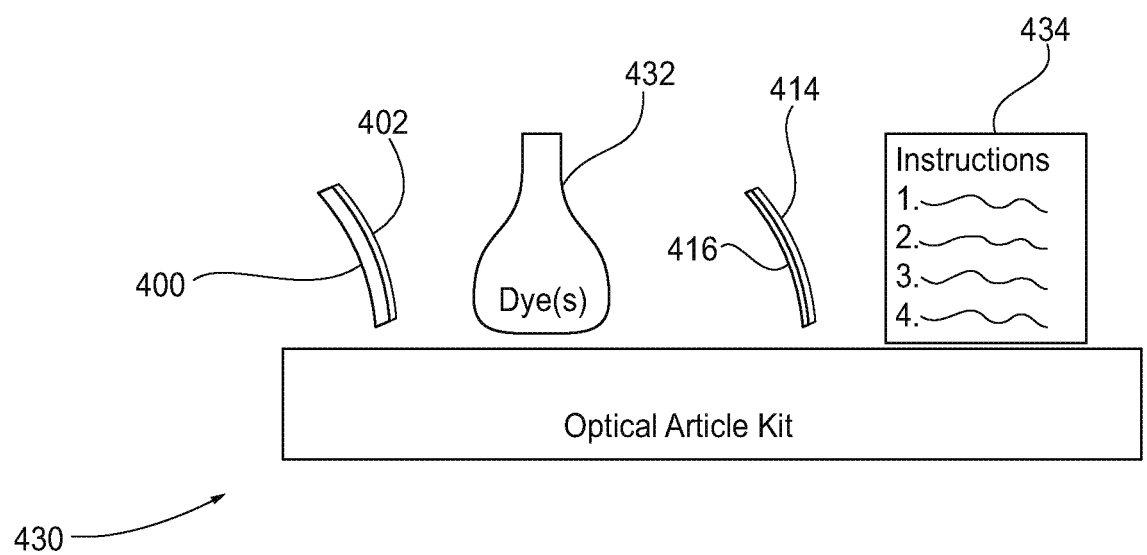
FIG. 14 illustrates a kit for making an optical article having a gradient tint and a gradient polarization.

Referring to FIG. 14, the producer may obtain a kit 430 for making an optical article having a gradient tint and gradient polarization. The kit 430 may include an optical element 400 comprising an anisotropic coating layer 402 having at least one alignment zone. This optical element 400 comprising the anisotropic coating layer 402 may be the previously described prefabricated optical element 400 comprising the anisotropic coating layer 402 (i.e. the kit 430 comprises the optical element 400 with the anisotropic coating layer 402 already applied to the optical element 400 before the kit 430 is obtained by the producer). The kit 430 may further comprise dye composition(s) 432. At least one of the dye compositions 432 comprises a dichroic dye and/or a photochromic-dichroic dye (and optionally a photochromic dye or a conventional dye). The kit 430 may comprise additional dye compositions, which may include a dichroic dye and/or a photochromic-dichroic dye and/or a photochromic dye and/or a conventional dye. The kit 430 may comprise a pre-mixed solution comprising a dye composition(s). The kit 430 may also comprise a dye transfer substrate 414 comprising a gradient layer of dye composition 416. The kit 430 may comprise a plurality of dye transfer substrates 414 having a gradient layer of dye composition 416, allowing the dye composition 432 contacted with the coating 402 of the optical element 400 to include different gradients of tint and polarization. The kit 430 may further comprise instructions 434 for contacting the dye composition 432 with the anisotropic coating layer 402 of the optical element 400, in order to form a predetermined concentration gradient. The kit 430 may be used by the producer to make an optical article 200 having a gradient tint and a gradient polarization by any of the above-described methods.

The instructions 434 for contacting the dye composition with the anisotropic coating layer to form a predetermined concentration gradient can be obtained by the consumer. The instructions 434 can include information such as, but not limited to, type(s) of optical element comprising the anisotropic coating layer having at least one alignment zone to use, type(s) of dye compositions to use, how to prepare a dye solution from the dye composition(s), method of contacting the dye solution with the anisotropic coating layer of the optical element, duration of contact required between the dye solution and the anisotropic coating layer of the optical element, additional process steps to produce the optical article once the dye solution has contacted the anisotropic coating layer of the optical element, etc. The instructions 434 can be obtained from the same third party manufacturer as the third party manufacturer of the optical element comprising the anisotropic coating layer having at least one alignment zone and the dye composition(s) (i.e. from a single commercial source). In another exemplary process, the instructions 434 can be obtained from a different third party producer or manufacturer as the third party manufacturer of the optical element comprising the anisotropic coating composition having at least one alignment zone and the dye compositions. In another exemplary process, the instructions 434 can be developed by the producer.

An optical article having a gradient tint and gradient polarization can be prepared from by any of the methods previously described.

The following examples are presented to demonstrate the general principles of the invention. The invention should not be considered as limited to the specific examples presented. All parts and percentages in the examples are by weight unless otherwise indicated.

Example 1

Part 1—Preparation of the Primer Layer Formulation (PLF)

Into a suitable container equipped with a magnetic stir-bar the following materials were added in the amounts indicated in the following Table 1.

TABLE 1

| Primer Layer Formulation | |
|---|---|
| Component | Amount |
| Polyacrylate polyol[1] | 6.687 g |
| POLYMEG ® 1000[2] | 16.65 g |
| DESMODUR ® PL 340[3] | 21.90 g |
| TRIXENE ® BI 7960[4] | 15.62 g |
| BYK ®-333[5] | 0.034 g |
| K-KAT ® 348[6] | 0.454 g |
| Gamma-Glycidoxypropyltrimethoxysilane | 1.79 g |
| TINUVIN ® 144[7] | 0.757 g |
| IRGANOX ® 245[8] | 0.757 g |
| Dipropylene Glycol Methyl Ether Acetate | 32.77 g |

[1] According to composition D of Example 1 in U.S. Pat. No. 6,187,444 replacing styrene with methyl methacrylate and 0.5% by weight of triphenyl phosphite was added.
[2] A polyalkylenecarbonate diol available from Great Lakes Chemical Corp.
[3] A blocked aliphatic polyisocyanate available from Covestro AG.
[4] A blocked trifunctional urethane crosslinker available from Baxenden Chemicals, Ltd
[5] A polyether modified polydimethylsiloxane available from BYK Chemie, USA
[6] A bismuth carboxylate catalyst available from King Industries.
[7] A hindered amine light stabilizer available from BASF Corporation.
[8] An antioxidant available from BASF Corporation.

The mixture was stirred at room temperature for 2 hours to yield a solution having 51.47 weight % final solids based on the total weight of the solution.

Part 2—Preparation of Liquid Crystal Alignment Formulation (LCAF)

A photoalignment material described in US Patent Application Publication No. US 2011/0135850 A1 as a Comparative Example was prepared by adding 6 weight percent of the photoalignment material to cyclopentanone, based on the total weight of the solution. This mixture was allowed to stir until the photoalignment material was completely dissolved.

Part 3—Preparation of the Anisotropic Layer Formulation (CLF)

An anisotropic layer formulation was prepared by combining the materials indicated in the following Table 2 and stirring for two hours at 80° C. to yield a homogeneous solution, then cooled to room temperature. All quantities are reported as parts by weight.

TABLE 2

| Anisotropic Layer Formulation CLF-1 | |
| --- | --- |
| Component | CLF-1 |
| Anisole | 19.50 |
| BYK ®-322[1] | 0.020 |
| 4-Methoxyphenol | 0.030 |
| RM257[2] | 12.60 |
| LCM-2[3] | 6.60 |
| LCM-3[4] | 5.40 |
| LCM-4[5] | 5.40 |
| IRGACURE ® 819[6] | 0.45 |
| PCDD 1[7] | 1.26 |
| PCDD 2[8] | 2.34 |

[1]An aralkyl modified poly-methyl-alkyl-siloxane available from BYK Chemie, USA.
[2]A liquid crystal monomer 4-(3-acryloyloxypropyloxy)-benzoic acid 2-methyl-1,4-phenylene ester, available commercially from EMD Chemicals, Inc.
[3]1-(6-(6-(6-(6-(6-(6-(6-(8-(4-(4-((1r,1's,4R,4'R)-4'-pentyl-[1,1'-bi(cyclohexane)]-4-carbonyloxy)2- or 3-methylphenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one prepared according to procedures described in U.S. Pat. No. 7,910,019B2.
[4]1-(6-(6-(6-(6-(6-(6-(6-(8-(4-(4-(4-(6-acryloyloxyhexyloxy)benzoyloxy)phenoxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexanol, prepared in accordance with Example 17 in U.S. Pat. No. 7,910,019B2.
[5]4-(((1s,4r)-r-pentylcyclohexane-1-carbonyl)oxy)phenyl 4-((6-(acryloyloxy)hexyl)oxy)benzoate.
[6]A photoinitiator available from BASF Corporation.
[7]A photochromic dichroic dye of structure 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran prepared according to the procedure of example 44 in U.S. Pat. No. 8,518,546B2.
[8]A photochromic dichroic dye of structure 3-phenyl-3-(4-morpholinophenyl)-10-[4-(4-(trans-4-pentylcyclohexyl)phenyl)benzamido]phenyl]-6-trifluoromethyl-13,13-dimethyl-3,13-dihydro-indeno[2',3':3,4]naphtho[1,2-b]pyran prepared in accordance with Example 33 in U.S. Pat. No. 8,545,984B2.

Part 4—Procedures Used for Preparing the Substrate with Aligned Anistropic Layer Corona Treatment:

Where indicated below, prior to the application of any of the reported coating layers, the substrate or coated substrate was subject to corona treatment by passing on a conveyor belt in a Tantec EST Systems Power Generator HV 2000 series corona treatment apparatus having a high voltage transformer. The substrates were exposed to corona generated at 1288 Watts, while traveling on a conveyor at a belt speed 3.8 ft/minute.

Substrate Preparation:

Lens substrates of CR-39® SFSV Base 4.25 with a diameter of 75 mm were obtained from Essilor. Each substrate was cleaned by wiping with a tissue soaked with acetone, dried with a stream of air and corona treated as described above.

Coating Procedure for the Primer Layer:

The PLF was applied to the prepared lens by dispensing approximately 1.5 mL of the solution and spinning the substrates at 500 revolutions per minute (rpm) for 2 seconds, followed by 2500 rpm for 2.2 seconds yielding a target film thickness of 4.5 microns. Afterwards, the coated substrates were placed in an oven maintained at 125° C. for 60 minutes, then cooled to room temperature. The coated substrates were then corona treated as described above.

Coating Procedure for the Liquid Crystal Alignment Layer:

The LCAF was applied to the test substrates by spin-coating on a portion of the surface of the test substrate by dispensing approximately 1.0 mL of the solution and spinning the substrates at 600 revolutions per minute (rpm) for 2 seconds, followed by 2,400 rpm for 2 seconds yielding a target film thickness of less than one micron. Afterwards, the coated substrates were placed in an oven maintained at 120° C. for 15 minutes, then cooled to room temperature.

The dried photoalignment layer on each of the substrates was at least partially ordered by exposure to linearly polarized ultraviolet radiation. The light source was oriented such that the radiation was linearly polarized in a plane perpendicular to the surface of the substrate. The amount of ultraviolet radiation that each photoalignment layer was exposed to was measured using a UV POWER PUCK™ High energy radiometer from EIT Inc., and was as follows: UVA 0.020 $W/cm^2$ and 0.298 $J/cm^2$; UVB 0.010 $W/cm^2$ and 0.132 $J/cm^2$; UVC 0.002 $W/cm^2$ and 0.025 $J/cm^2$; and UVV 0.025 $W/cm^2$ and 0.355 $J/cm^2$. After ordering at least a portion of the photo-orientable polymer network, the substrates were cooled to room temperature and kept covered, and were not subject to corona treatment.

Coating Procedure for the Anisotropic Layer:

The Anisotropic Layer Formulations CLF-1 was applied by spin coating at a rate of 500 revolutions per minute (rpm) for 2 seconds, followed by 1500 rpm for 1.3 seconds onto the at least partially ordered photoalignment materials on the lens substrates, yielding a target film thickness of approximately 20 microns. Each coated substrate was placed in an oven at 60° C. for 30 minutes. Afterwards they were cured under two ultraviolet lamps in a UV Curing Oven Machine designed and built by Belcan Engineering under a nitrogen atmosphere while moving continuously on a conveyor belt operating at a linear rate of 61 cm/minute (2 ft/minute). The oven operated at peak intensity of 0.388 $Watts/cm^2$ of UVA and 0.165 $Watts/cm^2$ of UVV and UV dosage of 7.386 $Joules/cm^2$ of UVA and 3.337 $Joules/cm^2$ of UVV.

Part 5—Preparation of Gradient Tint/Gradient Polarization Optical Article

A solution of dichroic dye was prepared using the ingredients in Table 3

TABLE 3

| Dichroic Dye Formulation | |
| --- | --- |
| Component | Amount (Parts by weight) |
| Hydroxypropyl cellulose | 57.6 |
| HI-SIL ® T-700[1] | 19.2 |

TABLE 3-continued

Dichroic Dye Formulation

| Component | Amount (Parts by weight) |
|---|---|
| Diglyme | 168 |
| Tetrahydrofurfuryl alcohol | 144 |
| Propylene glycol n-butyl ether | 96 |
| Aromatic 100 | 480 |
| Dichroic Dye[2] | 40 |

[1] A thickener available from PPG Industries, Inc.
[2] A magenta fixed tint, polyazo dichroic dye corresponding to compound 1c in the following reference: Shigeo YASUI, Masaru MATSUOKA, Teijiro KITAO; Journal of the Japan Society of Colour Material, Vol. 61, (1988) No. 12, pp. 678-684.

Figure 15:
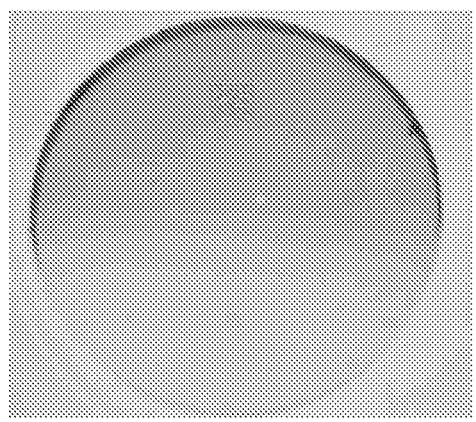
FIG. 15 is a photograph of a lens illuminated from behind with unpolarized light, exhibiting a visible tint gradient.
Figure 16:
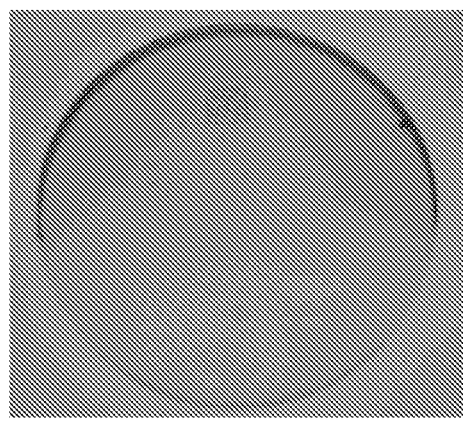
FIG. 16 is a photograph of the lens of FIG. 15 showing the passage of light through the lens when a polarizer which is oriented parallel (0°) to the alignment of the anisotropic coating layer.
Figure 17:
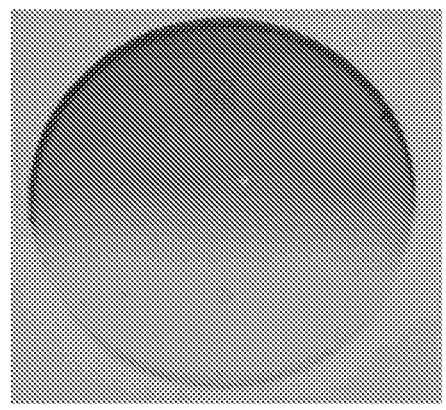
FIG. 17 is a photograph of the lens of FIG. 15 showing the passage of light through the lens when the polarizer is oriented perpendicular (90°) to the direction of alignment of the anisotropic coating layer.

The resulting tinted suspension was loaded in an airbrush with air pressure set to 20 psi. A lens, prepared in parts 1-4 above, was supported at an angle of 45° from vertical, and oriented such that the anisotropic layer alignment was oriented horizontally. The dichroic dye solution was sprayed onto the lens, using a horizontal back and forth motion, starting at the top and moving toward the bottom, such that the dichroic dye solution was applied thickest at the top and thinnest at the bottom. The coated lens was then placed in a thermal oven at 100° C. for 900 seconds. After cooling, the lens was rinsed with methanol to remove resin and residual dye. The lens produced demonstrated a gradient tint as well as a gradient polarization property. This is further demonstrated in the following figures. FIG. 15 shows the lens illuminated from behind with unpolarized light, exhibiting a visible tint gradient. FIG. 16 shows the passage of light through the lens when a polarizer which is oriented parallel (0°) to the alignment of the anisotropic layer. FIG. 17 shows the passage of light through the same lens when the polarizer is oriented perpendicular (90°) to the direction of alignment of the anisotropic coating layer.

Part 6—Preparation of Uniform Tint, Gradient Polarization Article

A solution of conventional dye was prepared using the ingredients in Table 4

TABLE 4

Conventional Dye Formulation

| Component | Amount (Parts by weight) |
|---|---|
| Hydroxypropyl cellulose | 57.6 |
| HI-SIL ® T-700 | 19.2 |
| Diglyme | 168 |
| Tetrahydrofurfuryl alcohol | 144 |
| Propylene glycol n-butyl ether | 96 |
| Aromatic 100 | 480 |
| Conventional Magenta dye | 40 |

To this was added the Aromatic 100 and conventional dye. The suspension was mixed until the dye dissolved.

The suspension of dichroic dye prepared in Part 5 was loaded in an airbrush with air pressure set to 20 psi. A lens, prepared in parts 1-4 above, was supported at an angle of 45° from vertical, and oriented such that the anisotropic layer alignment was oriented horizontally. The dichroic dye formulation was sprayed onto the lens, using a horizontal back and forth motion, starting at the top and moving toward the center, such that the dichroic dye suspension was applied thickest at the top, thinnest at the center and the bottom remained uncoated.

The suspension of conventional dye prepared in Table 4 above was loaded in a second airbrush with air pressure set to 20 psi. The conventional dye formulation was sprayed onto the lens, using a horizontal back and forth motion, starting at the bottom and moving upward toward the center, such that the conventional dye formulation was applied thickest at the bottom, thinnest at the center, and was absent at the top, with overlap of the dichroic and conventional dye formulations in the center of the lens.

Figure 18:
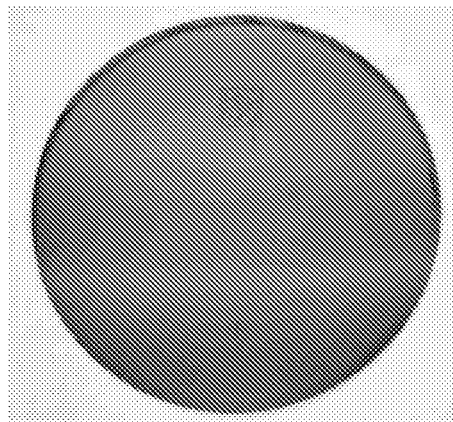
FIG. 18 is a photograph of a lens illuminated from behind with unpolarized light, exhibiting a uniform tint.
Figure 19:
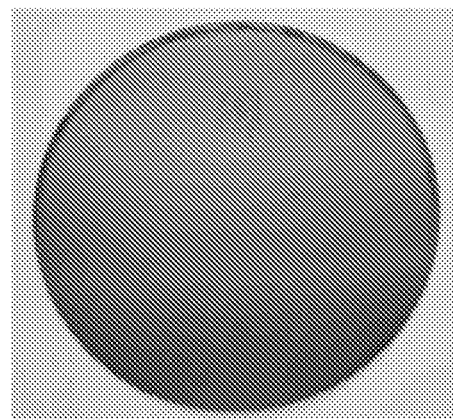
FIG. 19 is a photograph of the lens of FIG. 18 showing the passage of light through the lens when a polarizer which is oriented parallel (0°) to the alignment of the anisotropic coating layer.
Figure 20:
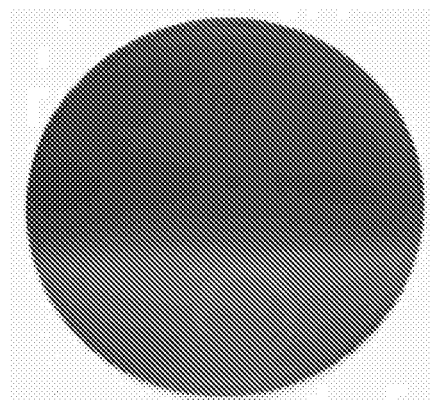
FIG. 20 is a photograph of the lens of FIG. 18 showing the passage of light through the lens when the polarizer is oriented perpendicular (90°) to the direction of alignment of the anisotropic coating layer.

The coated lens was then placed in a thermal oven at 100° C. for 900 seconds. After cooling, the lens was rinsed with methanol to remove resin and residual dye. The lens produced demonstrated a uniform tint across the surface of the lens, as well as a gradient polarization property. This is further demonstrated in the following figures. FIG. 18 shows the lens illuminated from behind with unpolarized light, exhibiting a uniform tint. FIG. 19 shows the passage of light through the lens when a polarizer which is oriented parallel (0°) to the alignment of the anisotropic layer. FIG. 20 shows the passage of light through the same lens when the polarizer is oriented perpendicular (90°) to the direction of alignment of the anisotropic coating layer.

Example 2

Part 1—Preparation of the Primer Layer Formulation (PLF)

Into a suitable container equipped with a magnetic stir-bar the following materials were added in the amounts indicated in the following Table 5.

TABLE 5

Primer Layer Formulation

| Component | Amount |
|---|---|
| Polyacrylate polyol[1] | 6.687 g |
| POLYMEG ® 1000[2] | 16.65 g |
| DESMODUR ® PL 340[3] | 21.90 g |
| TRIXENE ® BI 7960[4] | 15.62 g |
| BYK ®-333[5] | 0.034 g |
| K-KAT ® 348[6] | 0.454 g |
| Gamma-Glycidoxypropyltrimethoxysilane | 1.79 g |
| TINUVIN ® 144[7] | 0.757 g |
| IRGANOX ® 245[8] | 0.757 g |
| Dipropylene Glycol Methyl Ether Acetate | 32.77 g |

[1] According to composition D of Example 1 in U.S. Pat. No. 6,187,444 replacing styrene with methyl methacrylate and 0.5% by weight of triphenyl phosphite was added.
[2] A polyalkylenecarbonate diol available from Great Lakes Chemical Corp.
[3] A blocked aliphatic polyisocyanate available from Covestro AG.
[4] A blocked trifunctional urethane crosslinker available from Baxenden Chemicals, Ltd
[5] A polyether modified polydimethylsiloxane available from BYK Chemie, USA
[6] A bismuth carboxylate catalyst available from King Industries.
[7] A hindered amine light stabilizer available from BASF Corporation.
[8] An antioxidant available from BASF Corporation.

The mixture was stirred at room temperature for 2 hours to yield a solution having 51.47 weight % final solids based on the total weight of the solution.

Part 2—Preparation of Liquid Crystal Alignment Formulation (LCAF)

A photoalignment material described in US Patent Application Publication No. US 2011/0135850 A1 as a Comparative Example was prepared by adding 6 weight percent of the photoalignment material to cyclopentanone, based on the total weight of the solution. This mixture was allowed to stir until the photoalignment material was completely dissolved.

Part 3—Preparation of the Anisotropic Layer Formulation (CLF)

An anisotropic layer formulation was prepared by combining the materials indicated in the following Table 6 and stirring for two hours at 80° C. to yield a homogeneous solution, then cooled to room temperature. All quantities are reported as parts by weight.

TABLE 6

| Anisotropic Layer Formulation CLF-1 | |
| --- | --- |
| Component | CLF-1 |
| Anisole | 19.50 |
| BYK ®-322[1] | 0.020 |
| 4-Methoxyphenol | 0.030 |
| RM257[2] | 12.60 |
| LCM-2[3] | 6.60 |
| LCM-3[4] | 5.40 |
| LCM-4[5] | 5.40 |
| IRGACURE ® 819[6] | 0.45 |
| PCDD 1[7] | 1.26 |
| PCDD 2[8] | 2.34 |

[1]An aralkyl modified poly-methyl-alkyl-siloxane available from BYK Chemie, USA.
[2]A liquid crystal monomer 4-(3-acryloyloxypropyloxy)-benzoic acid 2-methyl-1,4-phenylene ester, available commercially from EMD Chemicals, Inc.
[3]1-(6-(6-(6-(6-(6-(6-(6-(6-(8-(4-(4-((1r,1's,4R,4'R)-4'-pentyl-[1,1'-bi(cyclohexane)]-4-carbonyloxy)2- or 3-methylphenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-2-methylprop-2-en-1-one prepared according to procedures described in U.S. Pat. No. 7,910,019B2.
[4]1-(6-(6-(6-(6-(6-(6-(6-(6-(8-(4-(4-(4-(6-acryloyloxyhexyloxy)benzoyloxy)phenoxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexanol, prepared in accordance with Example 17 in U.S. Pat. No. 7,910,019B2.
[5]4-(((1s,4r)-r-pentylcyclohexane-1-carbonyl)oxy)phenyl 4-((6-(acryloyloxy)hexyl)oxy)benzoate.
[6]A photoinitiator available from BASF Corporation.
[7]A photochromic dichroic dye of structure 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran prepared according to the procedure of example 44 in U.S. Pat. No. 8,518,546B2.
[8]A photochromic dichroic dye of structure 3-phenyl-3-(4-morpholinophenyl)-10-[4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran prepared in accordance with Example 33 in U.S. Pat. No. 8,545,984B2.

Part 4—Procedures Used for Preparing the Substrate with Aligned Anistropic Layer Corona Treatment:

Where indicated below, prior to the application of any of the reported coating layers, the substrate or coated substrate was subject to corona treatment by passing on a conveyor belt in a Tantec EST Systems Power Generator HV 2000 series corona treatment apparatus having a high voltage transformer. The substrates were exposed to corona generated at 1288 Watts, while traveling on a conveyor at a belt speed 3.8 ft/minute.

Substrate Preparation:

Lens substrates of CR-39® SFSV Base 4.25 with a diameter of 75 mm were obtained from Essilor. Each substrate was cleaned by wiping with a tissue soaked with acetone, dried with a stream of air and corona treated as described above.

Coating Procedure for the Primer Layer:

The PLF was applied to the prepared lens by dispensing approximately 1.5 mL of the solution and spinning the substrates at 500 revolutions per minute (rpm) for 2 seconds, followed by 2500 rpm for 2.2 seconds yielding a target film thickness of 4.5 microns. Afterwards, the coated substrates were placed in an oven maintained at 125° C. for 60 minutes, then cooled to room temperature. The coated substrates were then corona treated as described above.

Coating Procedure for the Liquid Crystal Alignment Layer:

The LCAF was applied to the test substrates by spin-coating on a portion of the surface of the test substrate by dispensing approximately 1.0 mL of the solution and spinning the substrates at 600 revolutions per minute (rpm) for 2 seconds, followed by 2,400 rpm for 2 seconds yielding a target film thickness of less than one micron. Afterwards, the coated substrates were placed in an oven maintained at 120° C. for 15 minutes, then cooled to room temperature.

The dried photoalignment layer on each of the substrates was at least partially ordered by exposure to linearly polarized ultraviolet radiation. The light source was oriented such that the radiation was linearly polarized in a plane perpendicular to the surface of the substrate. The amount of ultraviolet radiation that each photoalignment layer was exposed to was measured using a UV POWER PUCK™ High energy radiometer from EIT Inc., and was as follows: UVA 0.020 $W/cm^2$ and 0.298 $J/cm^2$; UVB 0.010 $W/cm^2$ and 0.132 $J/cm^2$; UVC 0.002 $W/cm^2$ and 0.025 $J/cm^2$; and UVV 0.025 $W/cm^2$ and 0.355 $J/cm^2$. After ordering at least a portion of the photo-orientable polymer network, the substrates were cooled to room temperature and kept covered, and were not subject to corona treatment.

Coating Procedure for the Anisotropic Layer:

The Anisotropic Layer Formulations CLF-1 was applied by spin coating at a rate of 500 revolutions per minute (rpm) for 2 seconds, followed by 1500 rpm for 1.3 seconds onto the at least partially ordered photoalignment materials on the lens substrates, yielding a target film thickness of approximately 20 microns. Each coated substrate was placed in an oven at 60° C. for 30 minutes. Afterwards they were cured under two ultraviolet lamps in a UV Curing Oven Machine designed and built by Belcan Engineering under a nitrogen atmosphere while moving continuously on a conveyor belt operating at a linear rate of 61 cm/minute (2 ft/minute). The oven operated at peak intensity of 0.388 $Watts/cm^2$ of UVA and 0.165 $Watts/cm^2$ of UVV and UV dosage of 7.386 $Joules/cm^2$ of UVA and 3.337 $Joules/cm^2$ of UVV.

Part 5—Dip Coating Procedure

A solution of dichroic dyes was prepared by using the ingredients in Table 7.

TABLE 7

| Dichroic Dye Formulation | |
| --- | --- |
| Component | Amount |
| Aromatic 100 | 800 g |
| Dichroic Dye[1] | 2.0 g |

[1]A fixed tint, polyazo dichroic dye corresponding to compound 1c in the following reference: Shigeo YASUI, Masaru MATSUOKA, Teijiro KITAO; Journal of the Japan Society of Colour Material, Vol. 61, (1988) No. 12, pp. 678-684.

Figure 21:
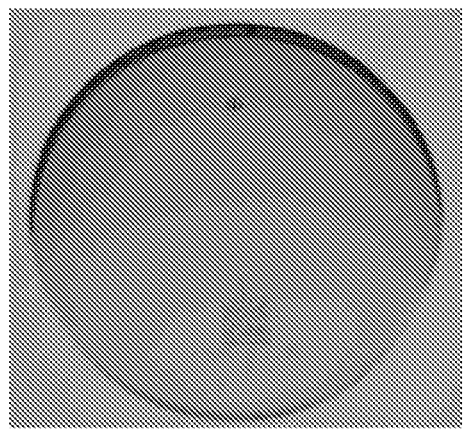
FIG. 21 is a photograph showing the passage of light through a lens when a polarizer which is oriented parallel (0°) to the alignment of the anisotropic coating layer.
Figure 22:
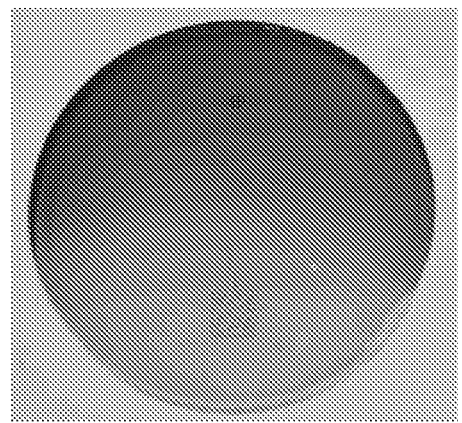
FIG. 22 shows the passage of light through the lens of FIG. 21 when the polarizer is oriented perpendicular (90°) to the direction of alignment of the anisotropic coating layer.

The solution was placed in a beaker and heated to 65° C. The lens prepared above was placed a clamp attached to the edges of the lens, which was held perpendicular to the solution, and the anisotropic layer alignment was oriented parallel to the surface of the solution. The lens was submerged fully into the solution for 3 seconds, then raised such that 30 mm of the lens was held above the solution. The lens was then dipped +/−10 mm from this position for three minutes at a rate of 125 cycles per minute. The lens was then fully submerged for 3 seconds, the removed from the solution. After release from the clamp, while maintaining the horizontal orientation of the anisotropic layer alignment, the lens was secured at an angle of 10° from vertical and placed in an oven at 100° C. for 120 seconds. After cooling, the lens was rinsed with methanol to remove residual dye. The lens produced demonstrated a gradient tint as well as a gradient polarization property. This is further demonstrated in the following figures. Both figures show the lens which is backlit through a polarizing filter. FIG. 21 shows the passage of light through the lens when a polarizer which is oriented parallel (0°) to the alignment of the anisotropic layer. FIG. 22 shows the passage of light through the same lens when the polarizer is oriented perpendicular (90°) to the direction of alignment of the anisotropic coating layer.

It will be readily appreciated by those skilled in the art that modifications as indicated above may be made to the invention without departing from the concepts disclosed in the foregoing description. Accordingly, the particular embodiments described in detail herein are illustrative only and are not limiting to the scope of the invention, which is to be give the full breadth of the appended claims and any and all equivalents thereof.

The invention claimed is:

1. A method of making an optical article having a gradient tint and a gradient polarization, comprising:
   forming a continuous coating including at least one alignment zone on an optical element, the coating formed from a flowable composition,
   cross-linking the flowable composition by curing to form a cross-linked coating, and
   contacting one or more dye compositions comprising a photochromic-dichroic dye with the optical element having the cross-linked coating including at least one alignment zone by:
      dipping the optical element into a dye solution comprising the dye composition, and
      withdrawing the optical element from the dye solution at a rate to provide a predetermined concentration gradient; or
      contacting the cross-linked coating with a dye transfer substrate comprising a gradient layer of the dye composition, and
      heating the dye transfer substrate to cause at least a portion of the dye composition to diffuse into the cross-linked coating,
   wherein at least a portion of the dye composition diffuses into the cross-linked coating at a predetermined concentration gradient along at least a portion of the cross-linked coating.

2. The method of claim 1, comprising:
   forming a first alignment region over at least a portion of the optical element;
   applying an anisotropic coating composition comprising an anisotropic material over the first alignment region, wherein the anisotropic coating composition is a flowable composition;
   aligning the anisotropic coating composition to form a first alignment zone; and
   cross-linking the anisotropic coating composition by curing to form a continuous anisotropic coating.

3. The method of claim 2, wherein the anisotropic coating composition forms an anisotropic coating layer which has a thickness of from 5 microns to 50 microns.

4. The method of claim 2, comprising:
   forming a second alignment region over at least a portion of the optical element;
   applying a second anisotropic coating composition over the second alignment region, wherein the anisotropic coating composition and the second anisotropic coating composition are the same or different, wherein the second anisotropic coating composition is a flowable composition;
   aligning the second anisotropic coating composition to form a second alignment zone; and
   cross-linking the second anisotropic coating composition by curing to form a continuous anisotropic coating.

5. The method of claim 4, wherein the second alignment region is formed by:
   applying an alignment coating composition over at least a portion of the optical element to form an alignment layer; and
   exposing a second portion of the alignment coating composition to a second polarizing radiation having a second polarizing direction to form the second alignment region in the alignment coating layer.

6. The method of claim 2, wherein the first alignment region is formed by:
   applying an alignment coating composition over at least a portion of the optical element to form an alignment coating layer; and
   exposing a first portion of the alignment coating composition to a first polarizing radiation having a first polarizing direction to form the first alignment region in the alignment coating layer.

7. The method of claim 6, wherein the alignment coating layer is applied by a method selected from the group consisting of spin coating, spray coating, dip coating, curtain coating, and inkjet coating.

8. The method of claim 6, wherein the alignment coating layer comprises at least one photo-alignment material.

9. The method of claim 2, wherein the anisotropic material comprises at least one crosslinkable liquid crystal material.

10. The method of claim 1, wherein the concentration gradient is a continuous gradient or a non-continuous gradient.

11. The method of claim 1, wherein the optical element comprises a first major surface and the at least one alignment zone is located on the first major surface.

12. The method of claim 11, wherein the first major surface is a curved surface.

13. The method of claim 1, wherein the optical article is selected from the group consisting of an optical lens, an ophthalmic lens, an optical filter, a window, a visor, a minor, and a display.

14. The method of claim 1, wherein the one or more dye compositions further comprises a photochromic dye.

* * * * *